(12) United States Patent
Teraura

(10) Patent No.: US 6,873,259 B2
(45) Date of Patent: Mar. 29, 2005

(54) ELECTRONIC DEVICE WITH ID TAG, CENTRAL PROCESSING UNIT WITH ID TAG, AND ID TAG FOR ELECTRONIC DEVICE

(75) Inventor: Nobuyuki Teraura, Tokai (JP)

(73) Assignee: Denso Corporation, Kariya (JP)

( * ) Notice: Subject to any disclaimer, the term of this patent is extended or adjusted under 35 U.S.C. 154(b) by 246 days.

(21) Appl. No.: 10/230,153

(22) Filed: Aug. 29, 2002

(65) Prior Publication Data

US 2003/0042316 A1 Mar. 6, 2003

(30) Foreign Application Priority Data

Aug. 31, 2001 (JP) ........................................ 2001-264023
Jul. 25, 2002 (JP) ........................................ 2002-216728

(51) Int. Cl.[7] ............................................. G08B 13/14
(52) U.S. Cl. .................. 340/572.1; 340/5.65; 235/375; 235/491
(58) Field of Search ...................... 340/572.1, 572.7, 340/572.8, 5.61, 5.65; 235/375, 376, 491, 492; 343/702, 728; 361/683

(56) References Cited

U.S. PATENT DOCUMENTS

| | | | | |
|---|---|---|---|---|
| 5,103,166 A | * | 4/1992 | Jeon et al. .................... | 324/764 |
| 5,467,304 A | * | 11/1995 | Uchida et al. ............... | 365/174 |
| 5,469,363 A | * | 11/1995 | Saliga ......................... | 700/225 |
| 5,528,223 A | * | 6/1996 | DiLonardo et al. ............ | 463/29 |
| 5,640,002 A | * | 6/1997 | Ruppert et al. ......... | 235/462.46 |
| 5,739,754 A | * | 4/1998 | Schrott et al. ............ | 340/572.2 |
| 5,748,084 A | * | 5/1998 | Isikoff ...................... | 340/568.1 |
| 5,767,789 A | * | 6/1998 | Afzali-Ardakani et al. | 340/10.1 |
| 5,777,553 A | * | 7/1998 | Perreau et al. ............... | 340/551 |
| 5,787,174 A | * | 7/1998 | Tuttle .......................... | 713/189 |
| 5,821,859 A | * | 10/1998 | Schrott et al. ........... | 340/572.6 |
| 5,847,650 A | * | 12/1998 | Zhou et al. ............... | 340/572.6 |
| 5,859,587 A | * | 1/1999 | Alicot et al. .............. | 340/572.8 |
| 5,874,902 A | * | 2/1999 | Heinrich et al. ......... | 340/10.51 |
| 5,914,691 A | * | 6/1999 | Mandai et al. .............. | 343/728 |
| 5,984,190 A | * | 11/1999 | Nevill ......................... | 235/492 |
| 5,995,006 A | * | 11/1999 | Walsh ..................... | 340/572.7 |
| 6,087,937 A | * | 7/2000 | McCarthy ................... | 340/567 |
| 6,249,227 B1 | * | 6/2001 | Brady et al. ............. | 340/572.1 |
| 6,297,780 B1 | * | 10/2001 | Kirisawa ..................... | 343/703 |
| 6,353,776 B1 | * | 3/2002 | Rohrl et al. .................... | 701/1 |
| 6,360,321 B1 | * | 3/2002 | Gressel et al. ............. | 713/172 |
| 6,466,126 B2 | * | 10/2002 | Collins et al. .............. | 340/333 |
| 6,466,771 B2 | * | 10/2002 | Wood, Jr. .................... | 455/101 |
| 6,535,697 B2 | * | 3/2003 | Reihl et al. .................... | 399/12 |
| 6,542,720 B1 | * | 4/2003 | Tandy ......................... | 257/725 |

* cited by examiner

Primary Examiner—Benjamin C. Lee
(74) Attorney, Agent, or Firm—Posz & Bethards, PLC

(57) ABSTRACT

An ID tag in an electronic device with a CPU and an antenna coil can communicate with the CPU through signal lines to store operation record data of the electronic device in a non-volatile memory therein. The record data is readable by a reader writer by transmission of the data with the antenna coil. A CPU including a semiconductor chip including a central processing unit portion, an ID tag portion can be used in an electronic device to store and read the operation record data. An ID tag for an electronic device has a communication circuit for communicating with a CPU for the electronic device to store operation record data of the electronic device from the CPU. The ID tag can store ticket data in a telephone to use as a ticket. The ID tags in electronic devices can record payment data for preventing illegal use.

10 Claims, 27 Drawing Sheets

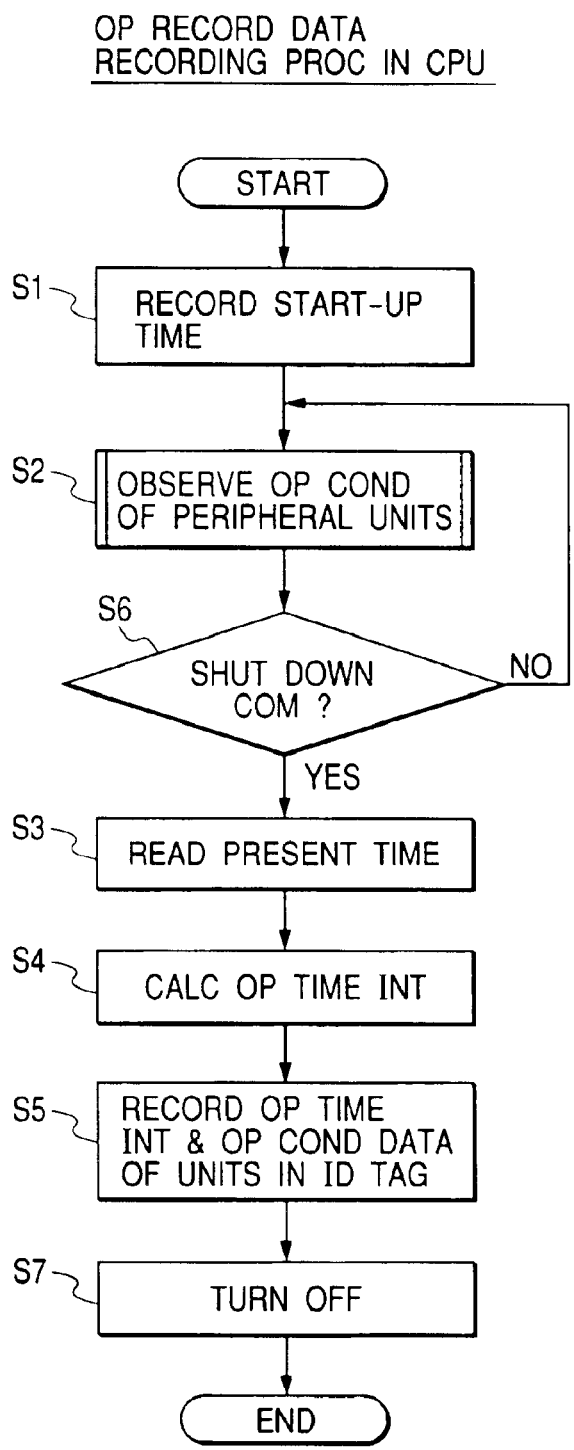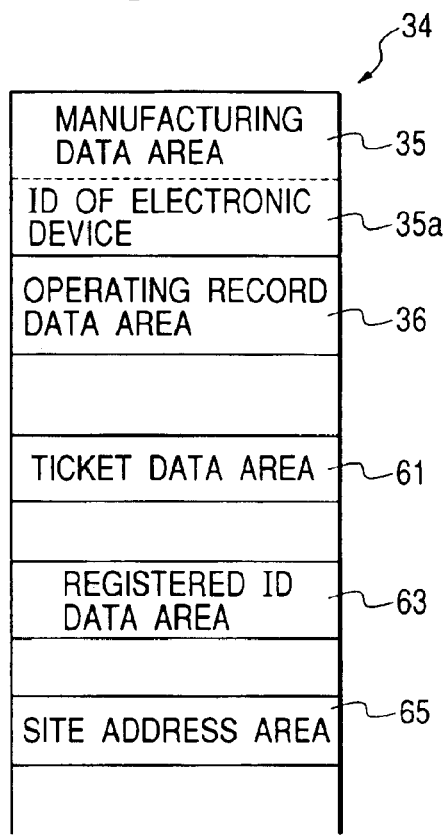

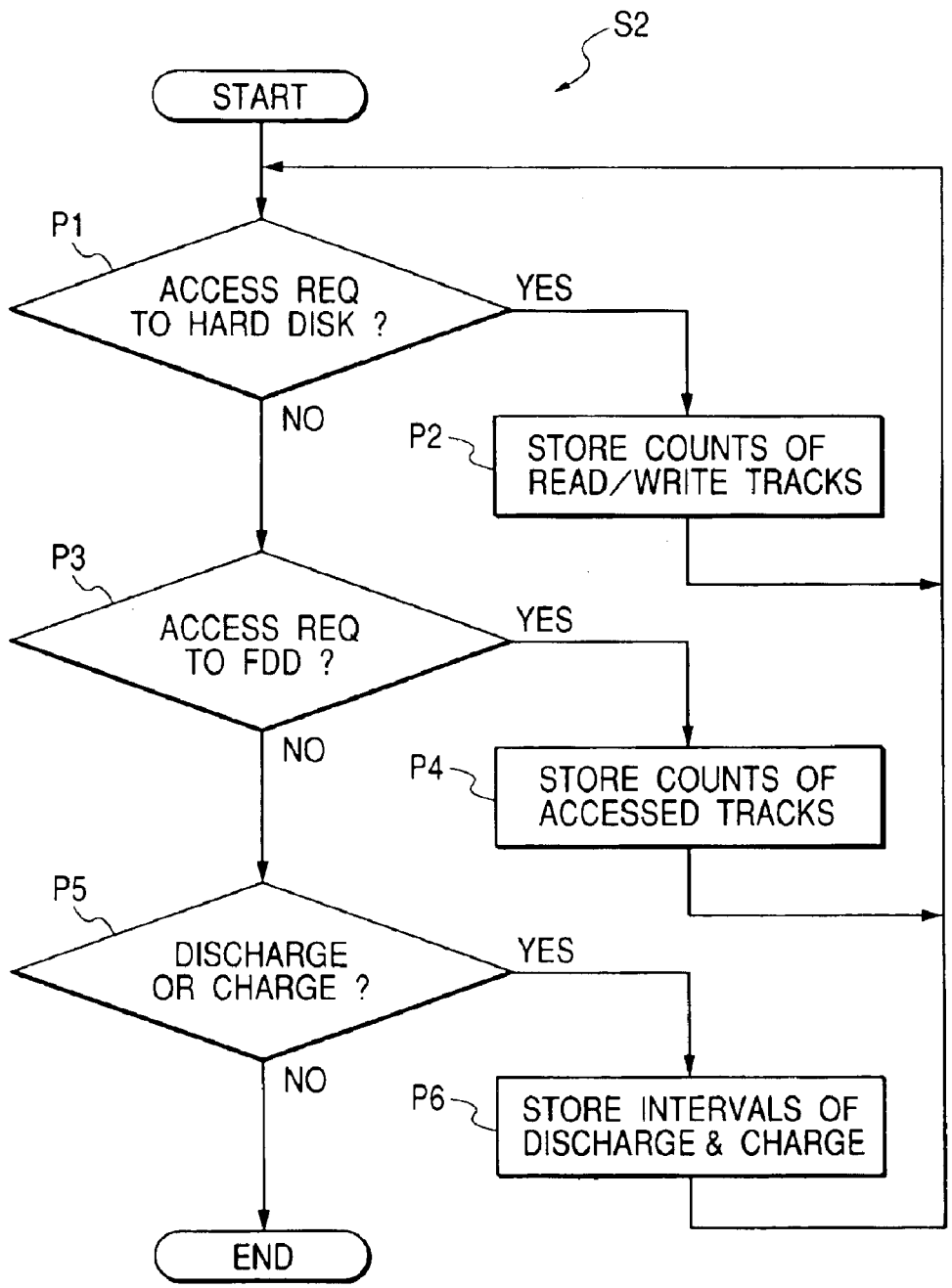

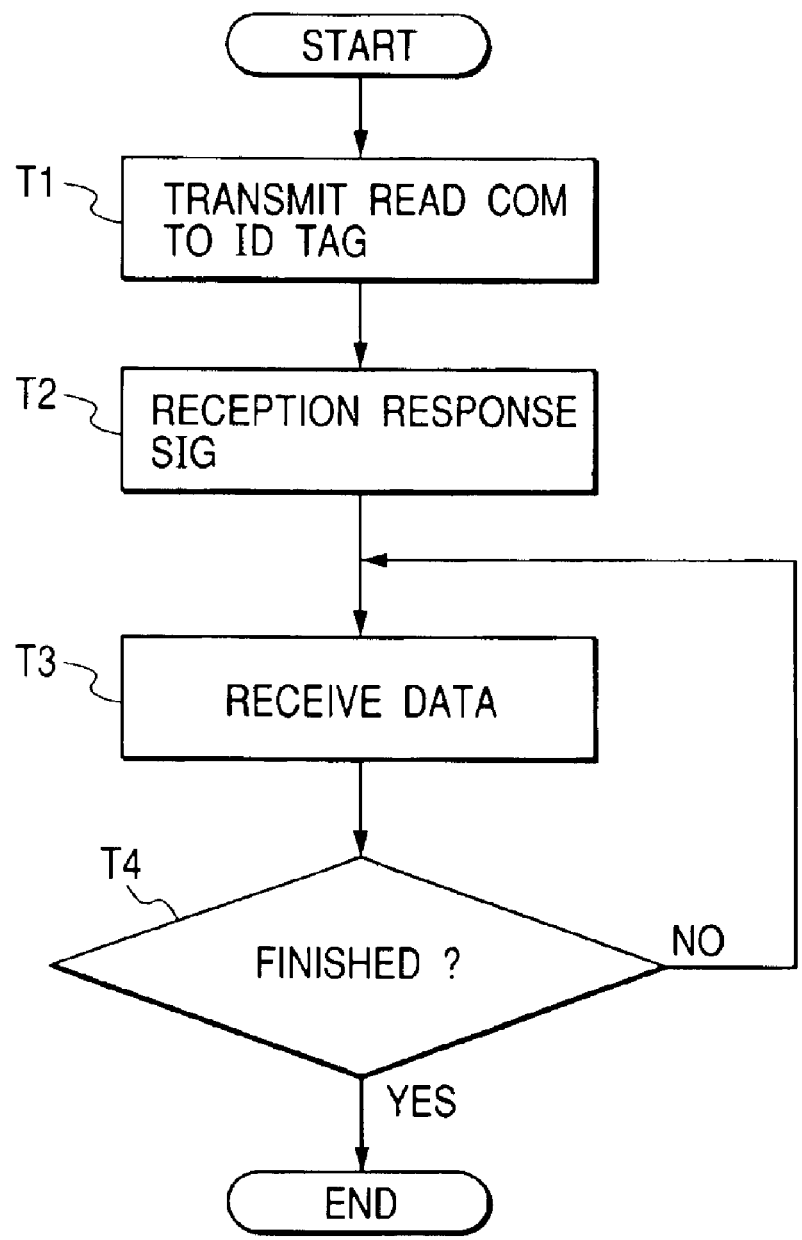

FIG. 17

| | | | | |
|---|---|---|---|---|
| 171 — MAKER REGION | COMMON | MODEL | MODEL NO. | |
| | | INDIVIDUAL | SERIAL NO. PRODUCTION DATE | 180 |
| | COMMON IN THE INDUSTRY | | PAYMENT FOR ELECT. DEVICE | 181 |
| | INDIVIDUAL MAKER | | WORKS NAME | |
| | | | PAYMENT FOR SOFTWARE | 182 |
| 172 — ARTERY PHYSICAL DISTRIBUTION REGION | TRANSPORT | | TRANSPORTER'S NAME | |
| | SELLING | | SELLER'S NAME | |
| 173 — MARKET REGION | USER | | USER'S NAME | |
| | MAINTENANCE | | REPLACED PART'S NAME | |
| | USING COND | | START OF USE (DATE), OPERATING TIME | |
| 174 — VINE PHYSICAL DISTRIBUTION REGION | RECEPTION | | PAYMENT FOR RECYCLING | |
| | DISPOSER | | RECYCLING AGENT'S NAME | |
| 175 — RECYCLE REGION | REUSE DATA | | VARIABLE MATERIAL  NO. OF TIMES OF REUSING PART | |
| | RECYCLE DATA | | PLASTIC PART MODEL NO. | |
| | SUBSTANCE DATA | | ENVIRONMENTALY LOADING SUBSTANCE | |

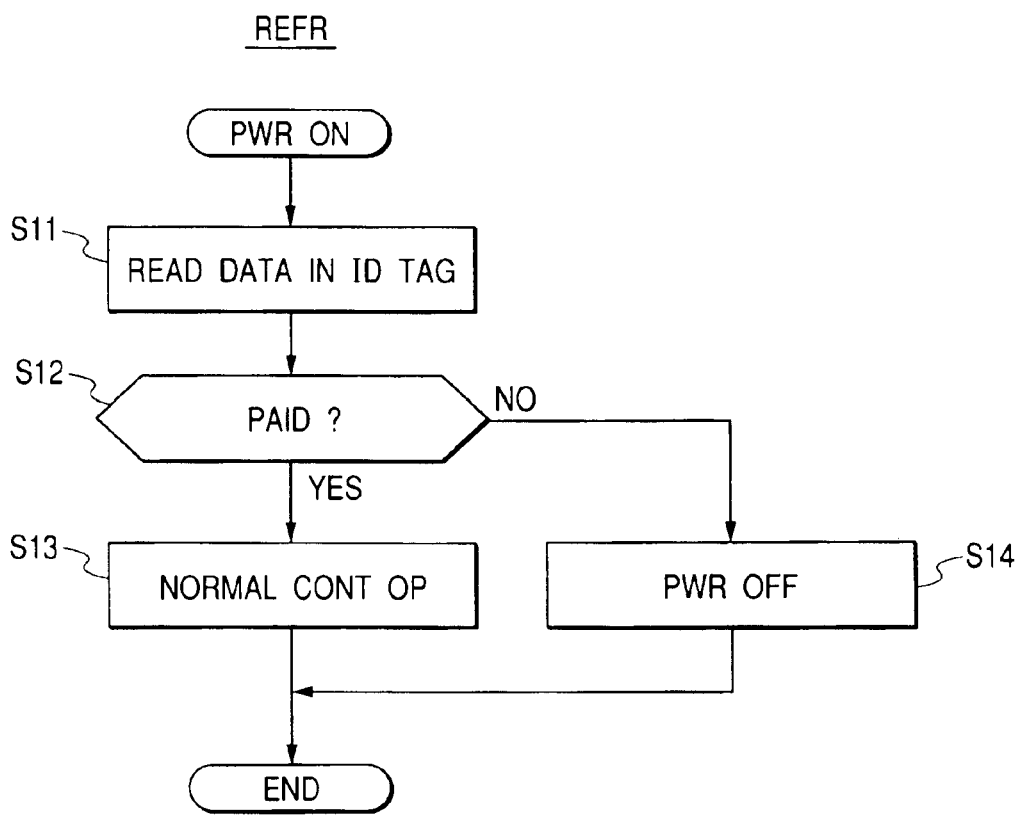

SPECIFIC SOFTWARE (FUNCTION)

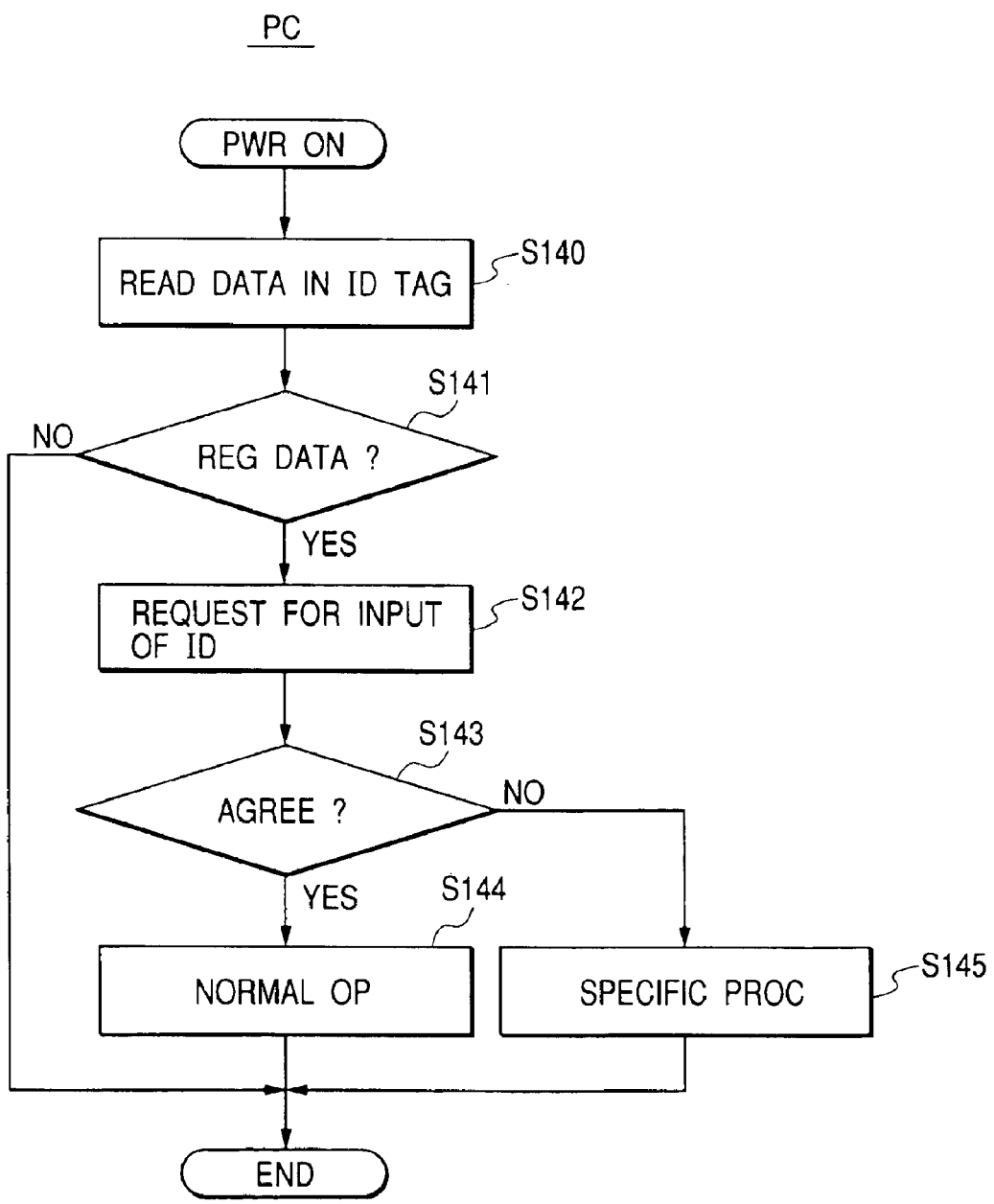

DIGITAL CAMERA

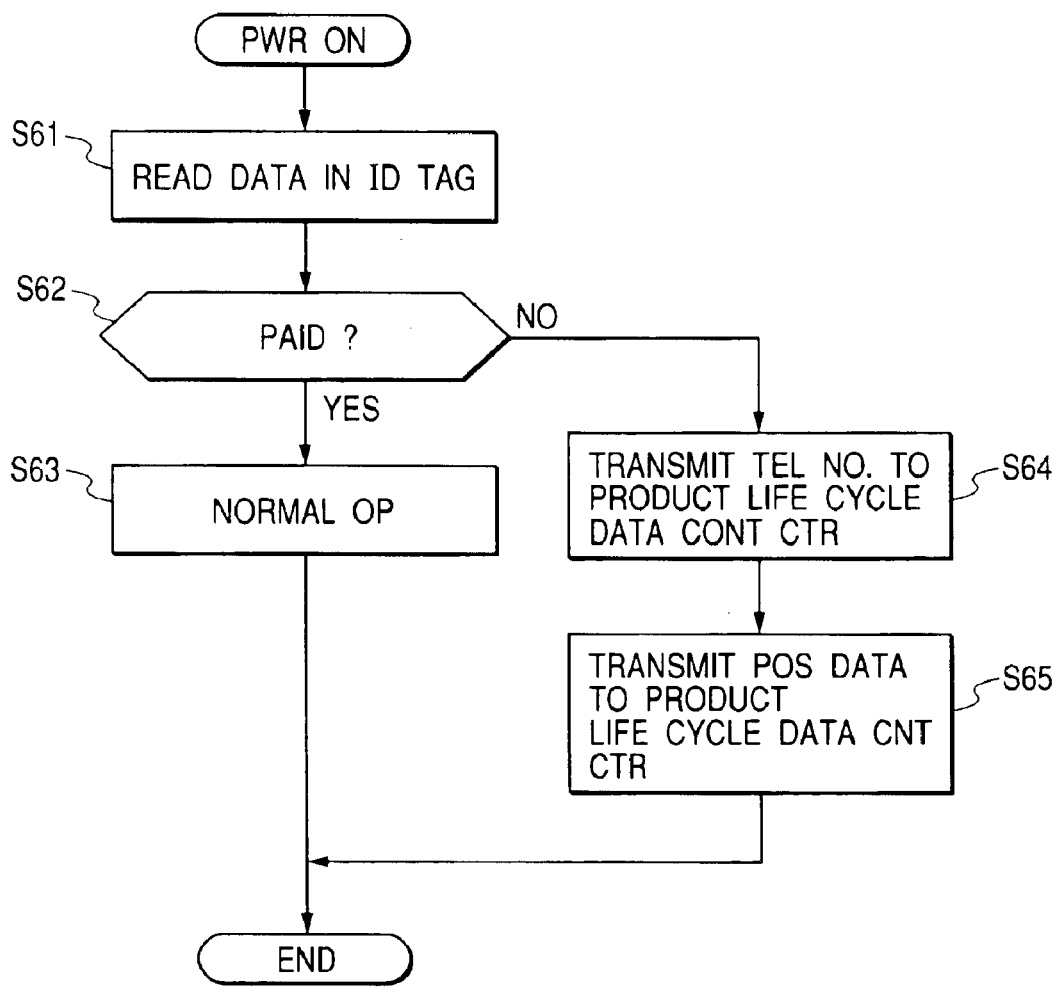

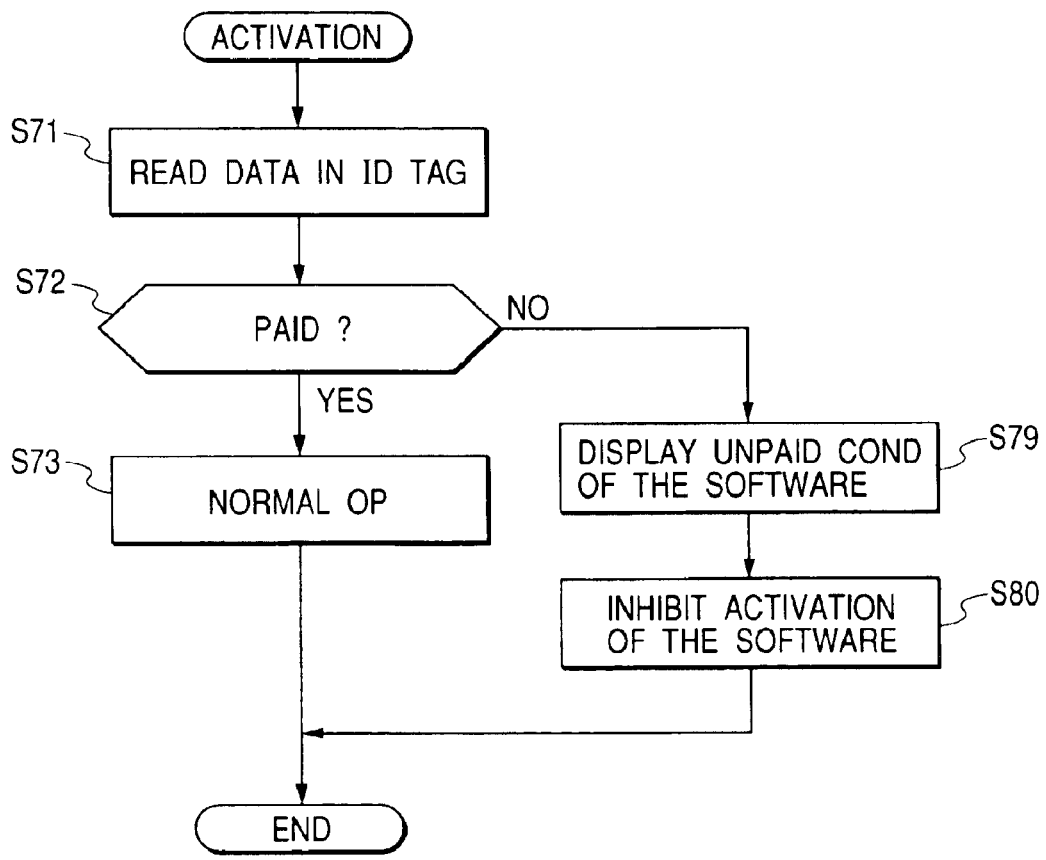

ELECTRONIC DEVICE WITH ID TAG, CENTRAL PROCESSING UNIT WITH ID TAG, AND ID TAG FOR ELECTRONIC DEVICE

BACKGROUND OF THE INVENTION

1. Field of the Invention

This invention relates to an electronic device with an ID tag, a central processing unit with an ID tag, and an ID tag for an electronic device.

2. Description of the Prior Art

ID tags for storing data wirelessly received from a reader writer and for reading and transmitting the stored data are known. The ID tags are used for controlling manufacturing, delivering, and stocking or the like.

On the other hand, there is need for controlling data for recycling or reusing electronic devices. Thus, it is required to provide an electronic device, a central processing unit, and an ID tag for an electronic device that are useful in recycling or reuse.

Moreover, there is need for electrically controlling data regarding payment of money such as payment data for ticket, an electronic device, software or the like. Thus, it is required to provide electronic devices capable of controlling data regarding payment of money.

SUMMARY OF THE INVENTION

The aim of the present invention is to provide a superior electronic device with an ID tag.

The aim of the present invention is to provide a superior a central processing unit with an ID tag.

The aim of the present invention is to provide a superior an ID tag for an electronic device.

According to the present invention, a first aspect of the present invention provides an electronic device comprising:

a central processing unit for controlling said electronic device;

a signal line; and an ID tag having a communication circuit for communicating with said central processing unit through said signal line and a non-volatile memory for storing data from said central processing unit.

The ID tag may comprise an antenna coil and a semiconductor circuit including said non-volatile memory, a read-write circuit for said non-volatile memory, a wireless communication circuit for wirelessly transmitting said data from said non-volatile memory through said antenna coil, and a power supply circuit for wirelessly receiving a supply power through said antenna coil to supply a power to said non-volatile memory, said read-write circuit, and said wireless communication circuit. In this case, the antenna coil may comprise a wire pattern on said printed circuit board or a discrete wire coil. Here, the printed circuit board may have a layer therein made of a high magnetic permeability material.

In the first aspect, the electronic device may further comprise: a portable telephone circuit for receiving ticket data with a predetermined format, wherein said central processing unit may store said ticket data in said ID tag when said portable telephone circuit receives said ticket data, and said central processing unit may read said ticket data from said ID tag and transmit said ticket data from said ID tag when said wireless communication circuit in said ID tag receives a predetermined reading request of said ticket data.

In the first aspect, the electronic device may have a plurality of functions executed by said central processing unit, and said central processing unit may read said data with a predetermined format from said ID tag and execute only a portion of said functions indicated by said data. In this case, said central processing unit may check whether, in said data, there is a predetermined data indicating that the cost of this electronic device has been paid, and said central processing unit may execute a specific one of said predetermined functions in the absence of said predetermined data.

According to the present invention, a second aspect of the present invention provides a central processing unit for an electronic device comprising:

a substrate;

a central processing unit portion in a form of a semiconductor chip on said substrate for controlling said electronic device, said central processing unit portion having a memory storing an operation record data obtaining program for obtaining operation record data of said electronic device;

a signal line; and an ID tag semiconductor circuit coupled to said central processing unit portion with a non-volatile memory for communicating with said central processor portion through said signal line to store said operation record data from said central processing unit portion in said non-volatile memory.

According to the present invention, a third aspect of the present invention provides an ID tag connectable to a central processing unit for controlling an electronic device electronic device, comprising;

a communication circuit for communicating with said central processing unit;

a memory circuit having a non-volatile memory for storing data from said central processing unit; and an antenna coil for wirelessly transmitting said data read from said non-volatile memory.

BRIEF DESCRIPTION OF THE DRAWINGS

The object and features of the present invention will become more readily apparent from the following detailed description taken in conjunction with the accompanying drawings in which:

FIG. 4A depicts a flow chart of an operation record data recording process according to the first embodiment;

FIG. 4B is an illustration of a memory map according to the invention;

FIG. 5 depicts a flow chart of an operation condition observing process according to the first embodiment;

FIG. 6 depicts a flow chart of reading process of data from the ID tag by the CPU according to the first embodiment;

FIG. 17 illustrates data structure in the ID tag according to the seventh embodiment;

FIGS. 18, 19, 20A, 20B, 21 to 24 illustrate operations of the electronic devices according to the seventh embodiment;

FIG. 26 illustrates operation of the CPU in the portable telephone according to the eighth embodiment;

FIG. 27 illustrates operation of the mobile terminal for preventing illegal use of the software installed in the mobile terminal according to the eighth embodiment;

The same or corresponding elements or parts are designated with like references throughout the drawings.

DETAILED DESCRIPTION OF THE INVENTION

[First Embodiment]

As an example of an electronic device with an ID (identification) tag, a personal computer will be described with assumption that the personal computer will be recycled or reused.

Figure 3:
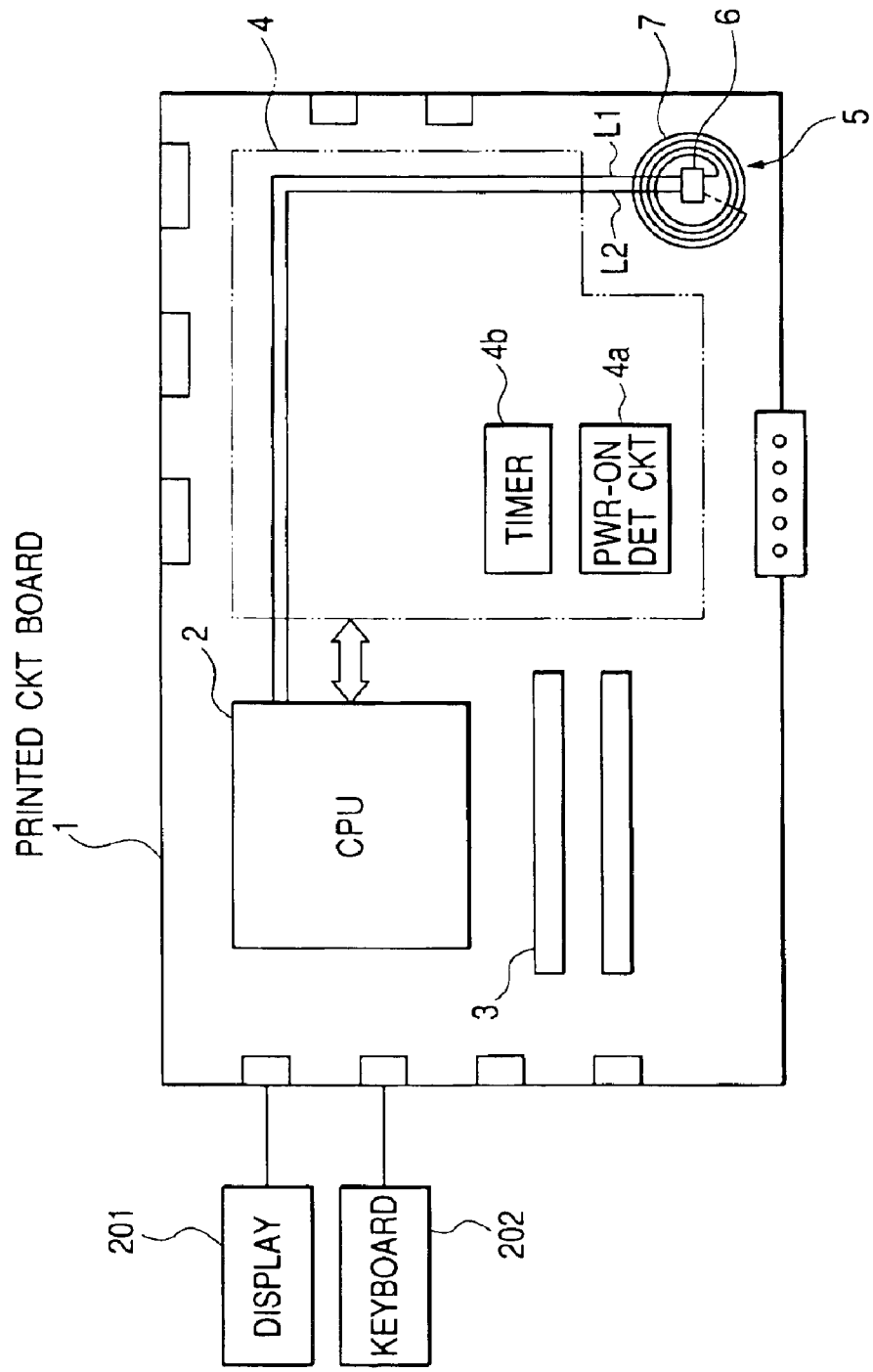
FIG. 3 is a plan view of a printed circuit board with a central processing unit and the ID tag according to the first embodiment.

As shown in FIG. 3, the printed circuit board (motherboard) 1 included in the personal computer has a CPU (central processing unit) 2, a peripheral circuit 4 including various semiconductor devices, and a main memory 3. The CPU 2 controls the peripheral circuit 4 and the main memory 3 and controls units in the personal computer. Moreover, the printed circuit board 1 has an ID tag 5 coupled to the CPU 2 arranged at a corner of the printed circuit board 1. The CPU 2 has a clock circuit (not shown) for generating a clock.

Figure 1:
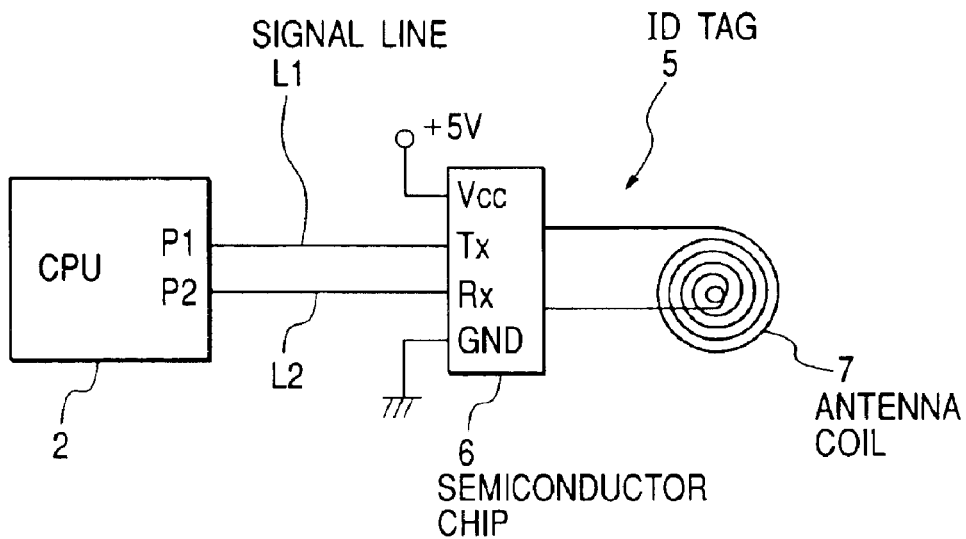
FIG. 1 is a block diagram of an electronic device with an ID tag according to a first embodiment.
Figure 2:
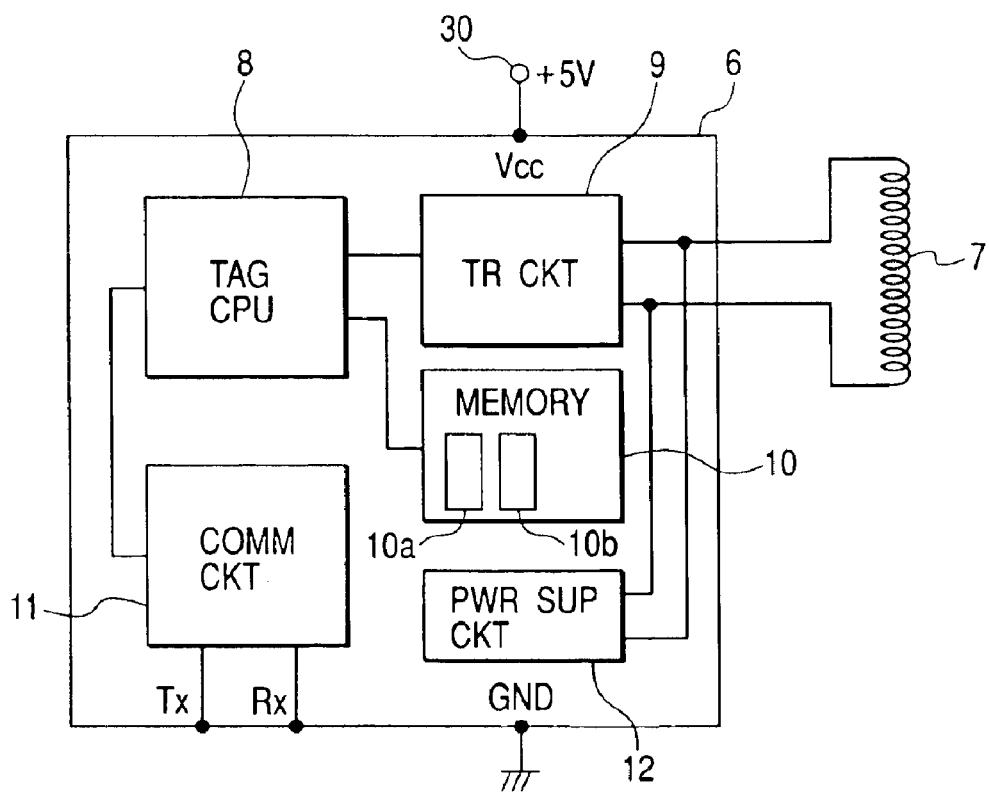
FIG. 2 is a block diagram of the ID tag shown in FIG. 1.

The ID tag 5 comprises a semiconductor chip 6 and an antenna coil 7. As shown in FIG. 2, the semiconductor chip 6 has a supply terminal (+5 V) 30, a GND (ground) terminal, and transmission terminal Tx and a reception terminal Rx that are connected to transmission and reception terminals P1 and P2 of the CPU 2 with signal lines (wiring patterns) L1 and L2, respectively. The antenna coil 7 is provided with a spiral wiring pattern formed on the printed circuit board 1 as a coil, wherein the semiconductor chip 6 is arranged at the center of the spiral wiring pattern.

The peripheral circuit 4 includes interface circuits (not shown) for interfacing with peripheral units (not shown) such as a hard disc, an FDD (floppy disk drive), a CD-ROM (compact disc-read only memory), a CD-R/RW (compact disc-recordable/rewritable), a keyboard 202, and a peripheral unit control circuit (not shown) such as a graphic accelerator coupled to a display 201 and a sound controller coupled to a speaker (not show). The peripheral circuit 4 further comprises a power-on detection circuit 4a and a timer circuit 4b for outputting the present time and date and for measuring a time interval. The CPU 2 in the personal computer operates in accordance with program data read from a hard disc (not shown).

FIG. 2 shows the structure of the ID tag 5. The tag CPU (central processing unit) 8 controls reading and writing operation, wireless transmission and reception operation, and communication operation with the CPU 2. More specifically, a transmission and reception circuit 9, a memory 10, and a communication circuit 11 are coupled to the tag CPU 8.

The transmission and reception circuit 9 generates a modulation signal in accordance with the data from the tag CPU 8 to effect communication through the antennal coil 7 and demodulates the signal received by the antenna coil 7 to supply the demodulated signal to the tag CPU 8.

The memory 10 includes a non-volatile memory 10a such as a flash memory and a read-write circuit 10b. The communication circuit 11 is an interface circuit for communicating with the CPU 2 to transmit and receive the data to/from the CPU 2. The power supply circuit 12 converts the radio wave signal received by the antenna coil 7 into a dc supply voltage supplied to the tag CPU 8, the memory 10, and transmission and reception circuit 9 when the supply terminal 30 cannot not receive the supply voltage Vcc. Thus, the ID tag 5 can operate during the turn off condition of the personal computer if the antenna coil 7 receives the radio wave signal.

FIG. 4A illustrates operation record storing process of the CPU 2.

For reusing and recycling of a body of a personal computer, there are two types of useful data, that is, various data obtained in manufacturing process (manufacturing data) and data accompanying operation of the electronic device (personal computer) and peripheral units. The manufacturing data includes data of a body of the electronic device (case, power supply, motherboard) and the peripheral units regarding structure, materials, and scraping processes. The manufacturing data is recorded in the non-volatile memory 10a of the ID tag 5 at the manufacture. When recycling, reusing, or scraping, the data can be read by a reader writer (not shown) from the ID tag 5 through the antenna coil 7.

The operation record data is obtained by the CPU 2 during operation of the electronic device periodically or a given timing.

FIG. 4B illustrates a memory map 34 of the non-volatile memory 10a according to this invention. The non-volatile memory 10a has a manufacturing data area 35 for storing the manufacturing data and an operating record data area 36 for storing operating record data. Moreover, the non-volatile memory 10a has a ticket data area 61, a registered identification data area 63, and a site address area 65.

In FIG. 4A, when the personal computer is turned on, the CPU 2 stores the startup time in step S1. Next, during the usual operation of the personal computer, the CPU 2 observes the operation of peripheral devices in or coupled to the personal computer in step S2. This operation is repeated until a shutdown command is detected in step S6.

At turning off of the personal computer, in response to the shutdown command in step S6, the CPU 2 reads the present time in step S3, calculates the operation time interval from the recorded startup time and the present time in step S4. Next, in step S5, the CPU 2 records the operation time interval data and device operation record data obtained in step S2 in the memory 10 of the ID tag 5 before actual cutting off the power supply in step S7, and finishes the process.

In the recording process in step S5, the CPU 2 transmits a write command to the ID tag 5. When the CPU 2 receives a reception response signal from the ID tag 5, the CPU 2 starts transmitting the data and finishes the recording process after finish of transmission. More specifically, to write the data in the ID tag 5, the CPU 2 transmits the data from the transmission and reception terminals P1 and P2 through the signal lines L1 and L2 to the ID tag 5. The tag CPU 8 in ID tag 5 receives the data through the communication circuit 11. When the reception process finishes, the tag CPU 8 records the received data in the memory 10.

FIG. 5 illustrates a peripheral unit operation condition observing process. This process is executed periodically or at a giving timing while the personal computer is turned on. The CPU 2 judges whether there is access to the hard disk drive (peripheral unit) in step P1. If the answer is YES, in step P2, the CPU 2 counts the number of tracks where R/W (reading/writing) is effected and stores the count or the total count.

Moreover, the CPU 2 judges whether there is access to the FDD drive in step P3. If the answer is YES, the CPU 2 counts the number of tracks accessed and stores the count in step P4.

Next, the CPU 2 judges whether there is charge or discharge of the battery in step P5. If the answer is YES, the CPU 2 counts the clock pulses to measure the interval of charging or discharging and stores the count for discharging or charging in step P6 or using the timer 4b.

This operation shown in FIG. 4A is repeated to provide the recent operational condition data of respective devices in the personal computer.

FIG. 6 illustrates a reading process of data from the ID tag 5.

The CPU 2 transmits a read command to the ID tag 5 in step T1 and waits for the reception response signal. When receiving the reception response signal in step T2, the CPU 2 further receives the desired data following the reception response in step T3. When the CPU 2 finishes reception of the data, processing ends.

Figure 7:
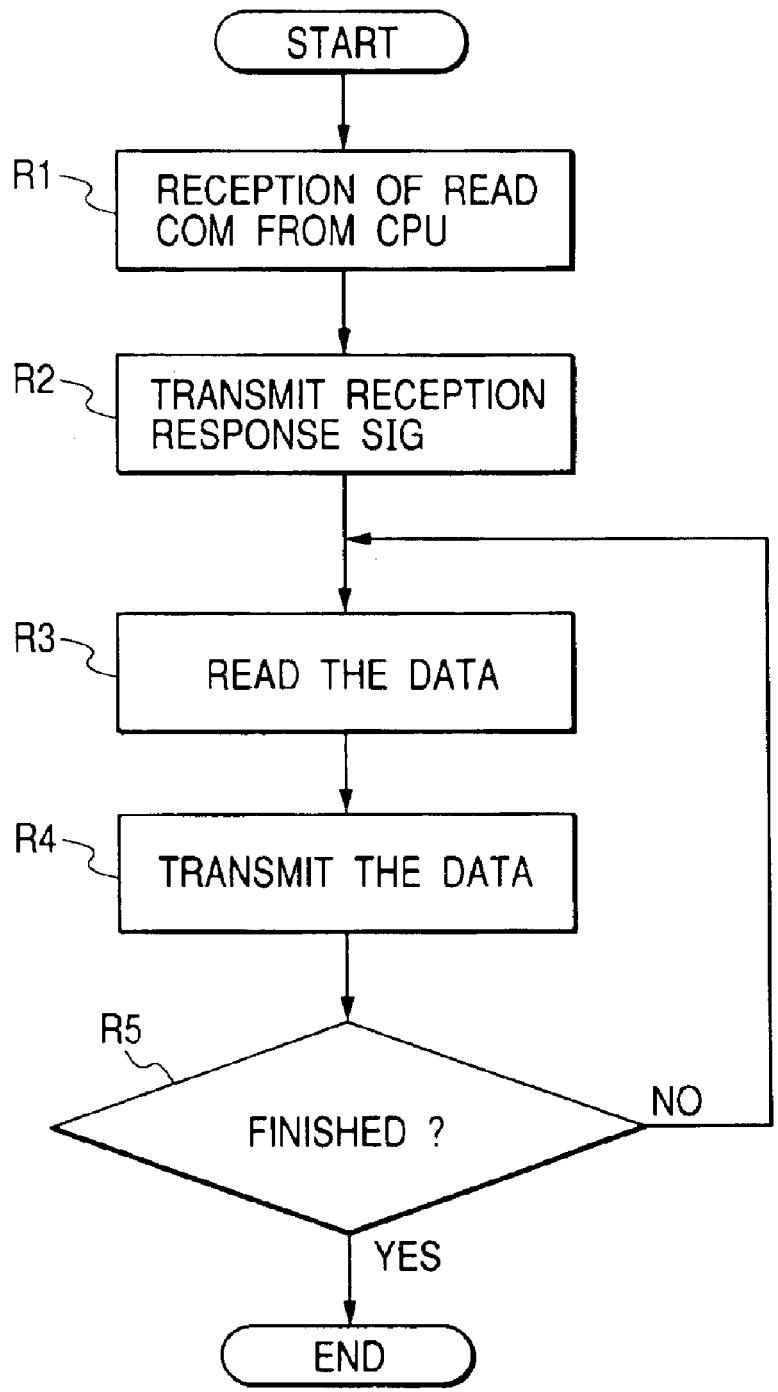
FIG. 7 depicts flow chart of reading and transmission process in the ID tag according to the first embodiment.

FIG. 7 illustrates a reading and transmission process in the ID tag 5. The ID tag CPU 8 executes the reading and transmission process in response to the CPU 2.

The ID tag CPU 8 receives a read command from the CPU 2 in step R1. Next, the ID tag CPU 8 transmits the reception response signal to the CPU 2. Following the transmission of the reception response signal, the ID tag CPU 8 reads data indicated by the received read command from the memory 10 in step R3, and then, transmits the read data to the CPU 2 through the signal lines L1 and L2 in step R4. When the ID tag CPU 8 finishes the transmission of the data in step R5, processing ends.

When the body of the personal computer is scrapped, reused, or recycled, the data recorded in the ID tag 5 is read with a reader writer (not shown) wirelessly. This reading process with the reader writer is carried out in the same process as that shown in FIGS. 6 and 7. The difference is that the reader writer transmits the radio wave signal to the ID tag 5. The power supply circuit 12 generates the supply voltage from the power received by the antenna coil 7 and supplies it to the ID tag CPU 8, the transmission and reception circuit 9, and the memory 10. Next, the reader writer transmits the read command in step T1 and successively executes the following steps in FIG. 6. On the other hand, the ID tag CPU 8 receives the read command from the reader writer through the antenna coil 7 and the transmission and reception circuit 9 in step R1, and successively executes the following steps in FIG. 7, wherein the data is transmitted through the antenna coil 7 wirelessly. This operation can be carried out although the personal computer is turned off because the supply power is transmitted from the reader writer.

According to this embodiment, the ID tag 5 is coupled to the CPU 2 through the signal lines L1 and L2 to allow directly recording the data. Therefore, this structure eliminates the necessity of newly preparing the reader writer circuit in the personal computer for communication with the ID tag 5 and thereby reduces the cost.

Moreover, according to this embodiment, during operation of the personal computer, the CPU 2 obtains and records the operation record data in the ID tag 5 at turning off of the personal computer. Thus, on reusing or recycling the personal computer, it is possible to read the operation record data in addition to the data at manufacturing of the personal computer. This makes it possible to properly reuse or recycle the personal computer quickly.

[Second Embodiment]

Figure 8A:
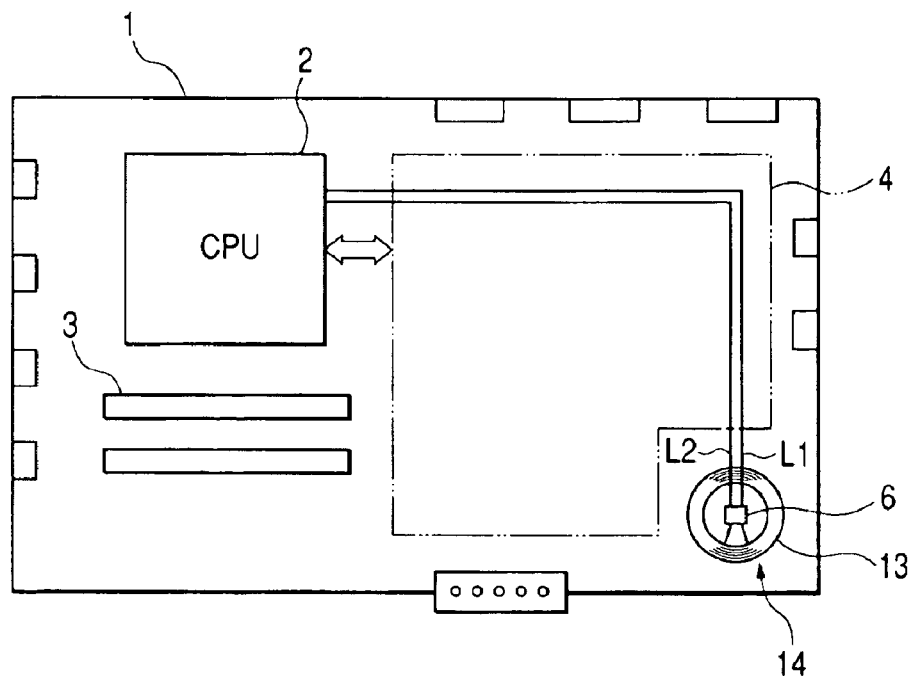
FIG. 8A is a plan view of a printed circuit board with a central processing unit and the ID tag according to a second embodiment.
Figure 8B:
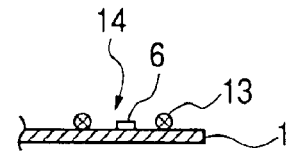
FIG. 8B is a partial sectional view of the printed circuit board in FIG. 8A.

FIG. 8A shows a plan view of a motherboard 1 of a personal computer according to the second embodiment. FIG. 8B shows a partial sectional view of the motherboard 1, wherein the ID tag 14 is fixed. The structure of the second embodiment is substantially the same as that of the first embodiment. The difference is in that a discrete antenna coil 13 including a wound wire is mounted on the motherboard 1 instead the antenna coil 7 having a pattern on the motherboard 1. The antenna coil 13 is mounted with adhesive or a fixing member or the like.

The antenna coil 7 used in the first embodiment has a small number of turns because the wire is provided by pattern on the substrate of the ID tag 5 at a low cost. On the other hand, the antenna coil 13 has many turns because of a wound thin conductor wire to provide a surer communication.

Thus, this structure allows directly writing data such as operation record data in the ID tag 14 and directly reading the data from the ID tag 14 by the CPU 2 through the signal lines L1 and L2 in the same way as the first embodiment. Further, on reusing or recycling, the data in the ID tag 14 can be read with a high sensitivity because the number of the turns of the antenna coil 14 is high. In other words, data reading with the reader writer can be done at a long distance. Thus, accessibility to the antenna coil is improved.

[Third Embodiment]

The structure of the third embodiment is substantially the same as that of the second embodiment. The difference is in that the electronic device according to the third embodiment is applied to an EFI (electronic fuel injection) unit 15 which can provide various operation record data such as a travel distance, a speed, acceleration, etc., as operation record data.

Figure 9:
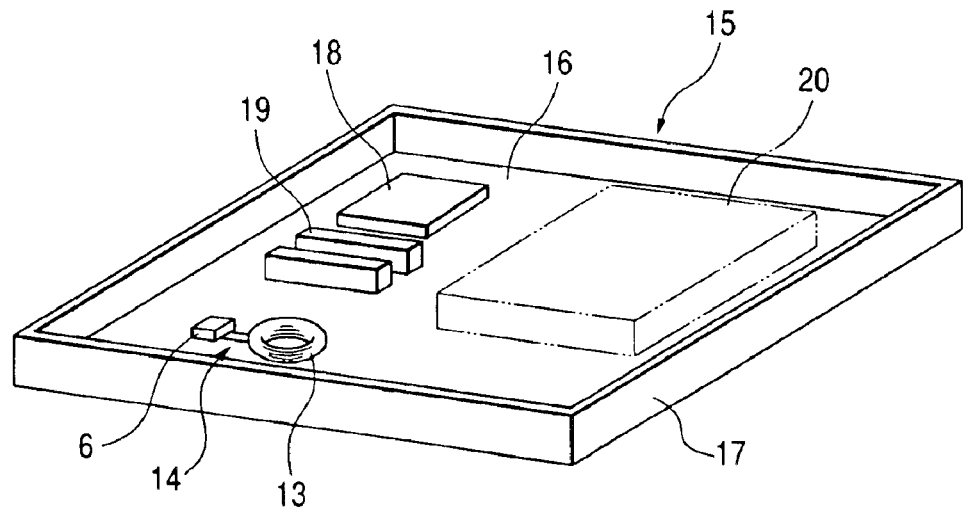
FIG. 9 is a perspective view of an electronic device according to a third embodiment.

FIG. 9 shows a perspective view of the EFI unit 15 as the electronic device according to the third embodiment. The EFI unit 15 has an aluminum case 17 for containing a printed circuit board (motherboard) 16. The printed circuit board 16 supports a CPU 18, a main memory 19, and a peripheral circuit 20, the semiconductor chip 6 of the ID tag 14 and the antenna coil 13.

In this structure, the manufacturing data is previously recorded at the manufacturing data area 35 of the non-volatile memory 10a of the ID tag 14 in the same way as the first embodiment, and further operation record data is recorded periodically or at a given timing at the operation record data area 36. As the operation record data, a predetermined part of an operation time interval of the engine, a travel distance, a speed, acceleration, a temperature, and a position (location), which are necessary for recycle and reuse, are recorded, namely, each data is selectively recorded. For example, position data provides analysis as to whether the motor vehicle frequently travels on expressways or on general roads. Moreover, the speed data and acceleration data provides analysis of difference in travailing patterns between flat roads and slope roads. This provides estimation in degree of loads to respective parts, the engine, and the EFI in a motor vehicle. In addition to the above-mentioned data, if necessary, the CPU 18 obtains data useful for effective judgment for recycling or reusing and records the data in ID tag 14.

As mentioned above, the third embodiment provides various useful and necessary data for recycle and reuse of the electronic device, units under control of the device, and other peripheral units corporately operating with the electronic device. In this embodiment, the ID tag 14 is used. However, the ID tag 5 used in the first embodiment can be used also.

[Fourth Embodiment]

Figure 10:
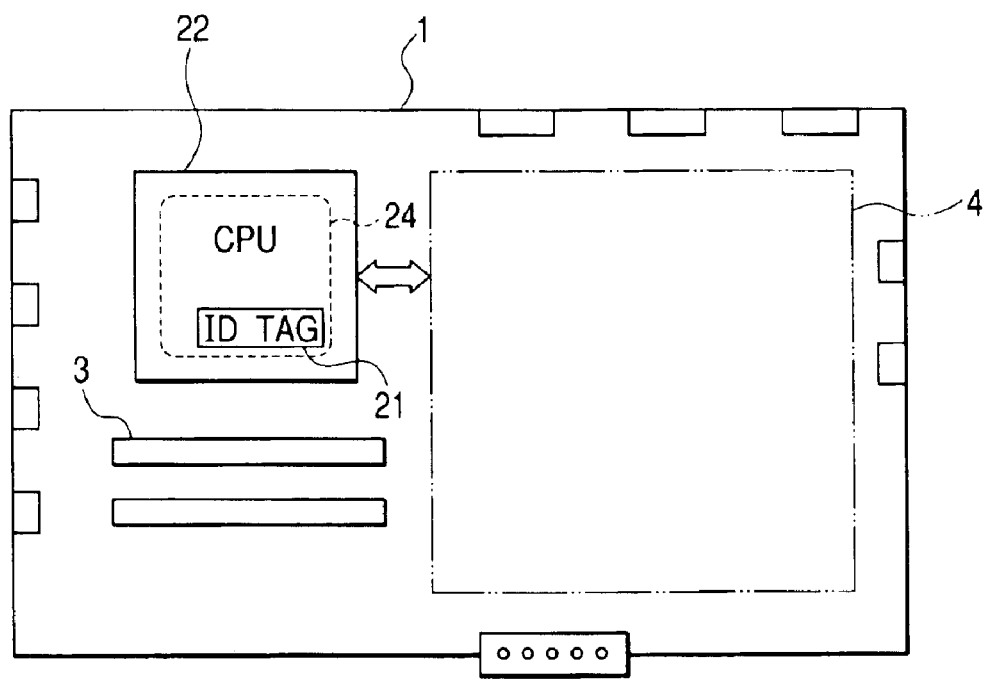
FIG. 10 is a plan view of a printed circuit board with a central processing unit and the ID tag according to a fourth embodiment.
Figure 11:
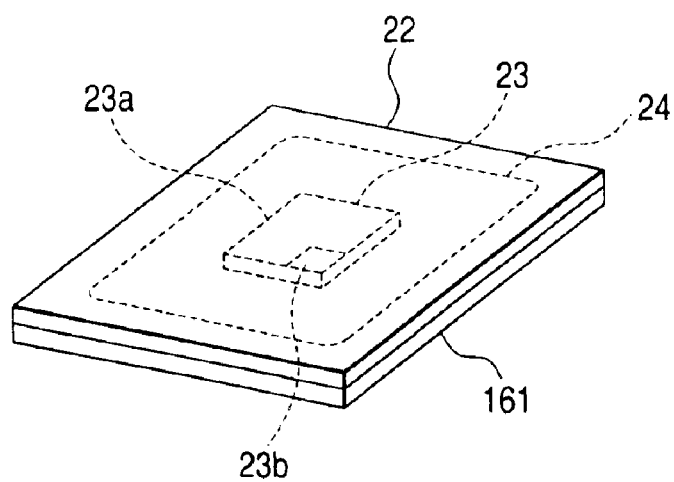
FIG. 11 is a perspective view of the chip shown in FIG. 10.
Figure 12:
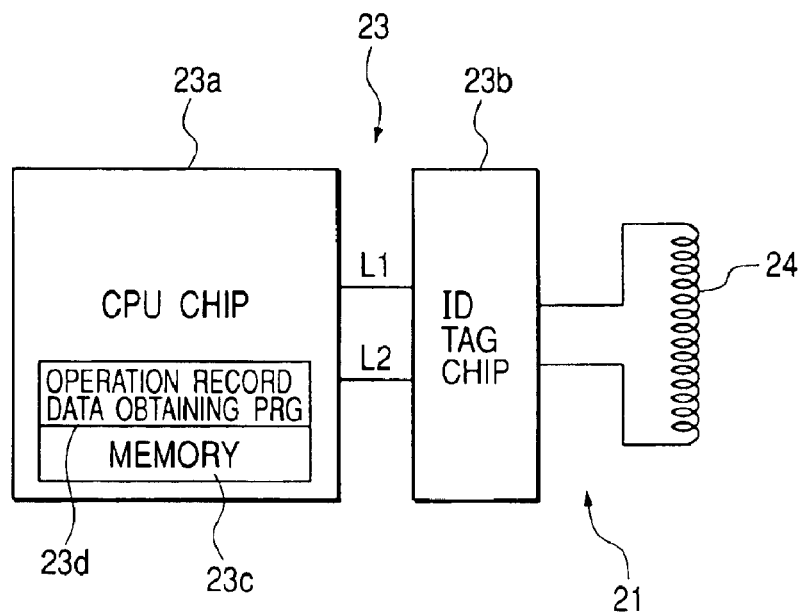
FIG. 12 is a block diagram of the ID tag shown in FIG. 11.

FIGS. 10 to 12 illustrate an electronic device and a CPU used therein according to the fourth embodiment. The structure of the fourth embodiment is substantially the same as that of the first embodiment. The difference is in that a central processing unit 22 is integrated with the ID tag 21 on a substrate 161 and mounted on the motherboard 1 instead the general central processing unit. As shown in FIG. 11, the central processing unit 22 comprises a chip 23 including a central processing unit chip 23a and an ID tag chip 23b integrated with the central processing unit chip 23a, and an antenna coil 24 arranged around the chip 23, wherein these elements are molded with plastic.

Moreover, as shown in FIG. 12, the central processing unit chip 23a and the ID tag chip 23b for ID tag 21 are electrically coupled to each other through the signal lines L1 and L2 (not shown in FIGS. 10 and 11). The ID tag chip 23b has the circuit structure as shown in FIG. 2 and thus, is coupled to the antenna coil 24 through the transmission and reception circuit 9 therein.

Thus, the central processing unit 22 for an electronic device includes the substrate 161, a central processing unit chip 23a on the substrate 161 for controlling the electronic device, the signal lines L1 and L2; and the ID tag chip 23b coupled to the central processing unit chip 23a with the non-volatile memory 10a for communicating with the central processing unit chip 23a through the signal lines L1 and L2 to store operation record data from the central processing unit chip 23a in the non-volatile memory 10a. The central processing unit chip 23a has a memory 23c storing an operation record data obtaining program 23d for obtaining operation record data of the electronic device.

This structure eliminates the necessity of mounting the ID tag in addition to the CPU because the chip 23 includes the central processing unit chip 23a and the ID tag chip 23b, so that the size of the device can be miniaturized. Moreover, this structure further eliminates necessity of additional wires formed on the printed circuit board 1 for connection between the central processing unit 2 and the ID tag 5.

[Fifth Embodiment]

Figure 13:
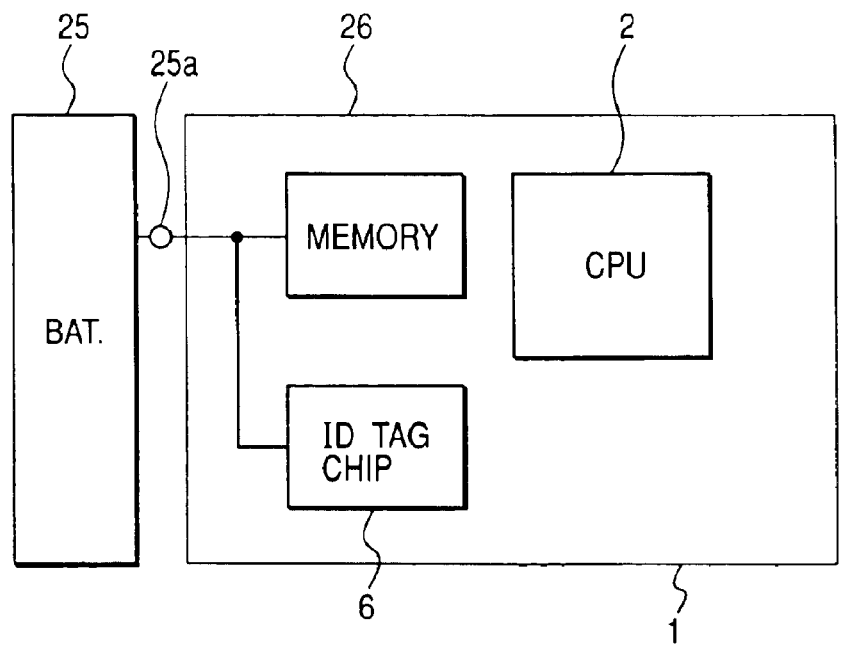
FIG. 13 is a block diagram of the electronic device according to a fifth embodiment.

FIG. 13 shows the electronic device according to the fifth embodiment. The structure of the fifth embodiment is substantially the same as that of the first embodiment. The difference is in that the ID tag chip 6 is supplied with a supply voltage from a battery 25 originally provided for battery backup for the memory 26 of the electronic device. Thus, the ID tag chip 6 and the memory 26 are supplied with the supply voltage from the battery 25, so that, while the main power for the electronic device is off, the ID tag chip 6 is operable.

Here, although the ID tag chip 6 can be operable by wirelessly receiving the power from the reader writer, the reader writer must be located at a position adjacent to the ID tag chip 6 to receive the supply power. This limits the possible distance of communication. On the other hand, this structure moderates this limitation by directly receiving the supply power from the battery 25. In other words, this structure substantially makes the communicable distance between the ID tag chip 6 and the reader writer longer. Thus, the operability of the ID tag chip 6 can be improved.

Moreover, since the battery 25 is originally provided for the electronic device, no special battery for the ID tag chip 6 is required, so that the cost of manufacturing the ID tag chip 6 can be suppressed. In addition, because the ID tag chip 6 and the memory 26 only use the supply voltage from the battery 25, the battery 25 is operable after scraping. Accordingly, the battery 25 can be used effectively.

[Sixth Embodiment]

Figure 14:
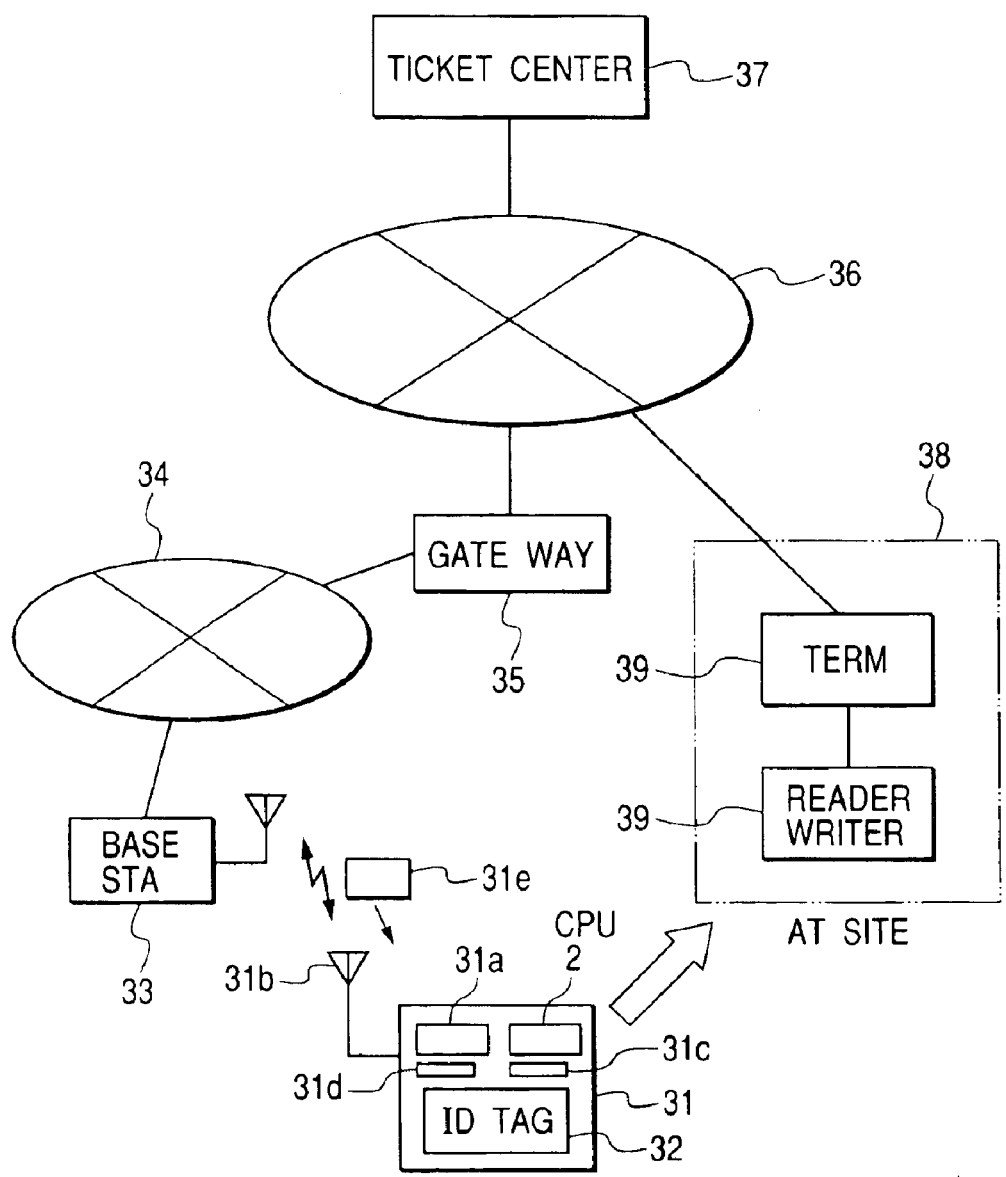
FIG. 14 illustrates a ticketing system including the electronic device according to a sixth embodiment.
Figure 15:
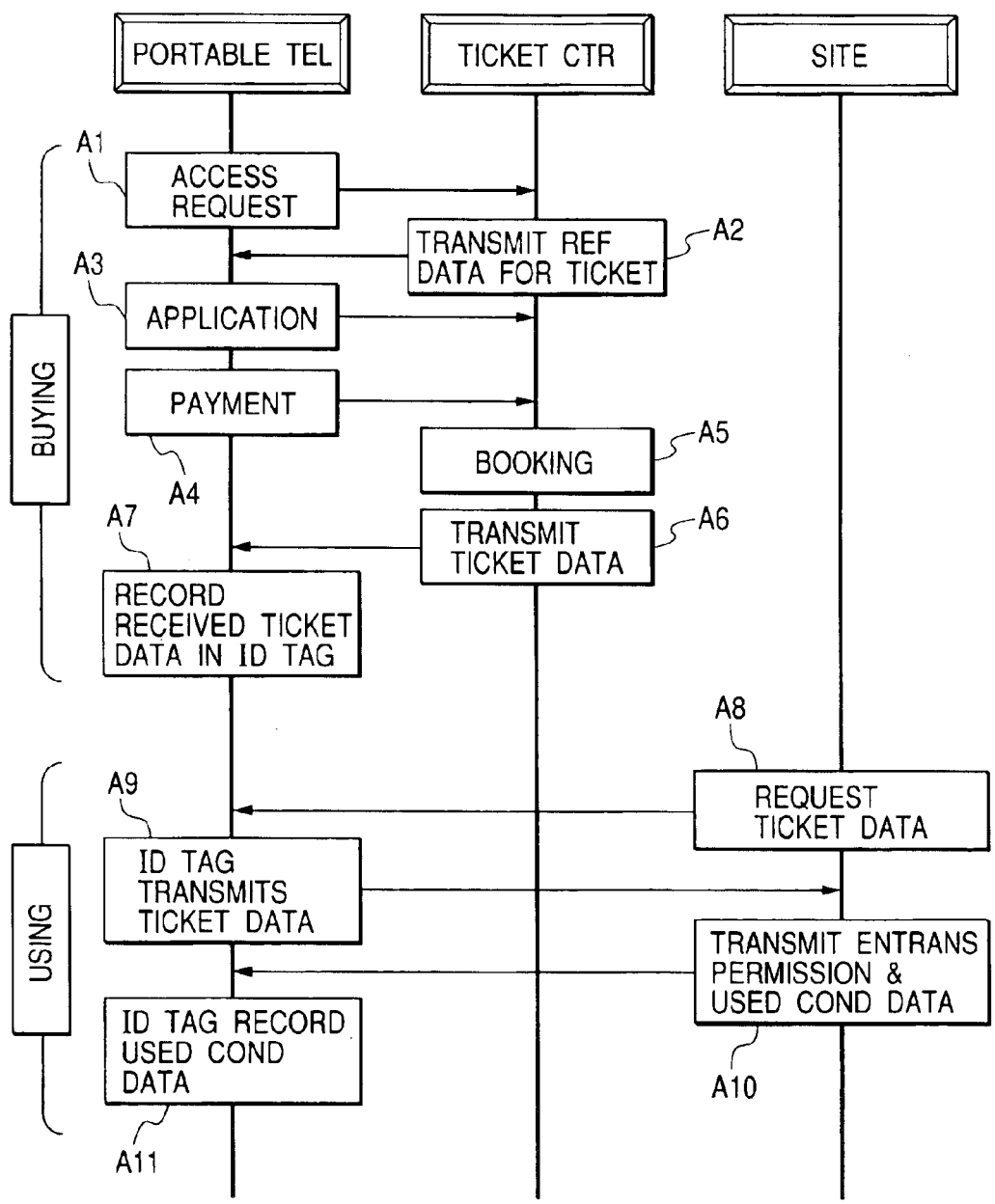
FIG. 15 illustrates operation among the portable telephone, the ticket center, and the site according to the sixth embodiment.

FIGS. 14 and 15 show the electronic device (portable telephone) according to a sixth embodiment. The structure of the sixth embodiment is substantially the same as that of the first embodiment. The difference is in that a portable (cellular) telephone circuit 31a for receiving ticket data with a predetermined format is further provided. Moreover, the CPU 2 stores the ticket data at the ticket data area 61 (FIG. 4B) in the ID tag 32 when the portable telephone circuit 31a receives the ticket data. Moreover, the ID tag 32 reads the ticket data and transmits the read ticket data when the wireless communication circuit of the ID tag 32 receives a predetermined reading request of the ticket data.

In this embodiment, the ticket data is acquired with the portable telephone circuit 31a and the acquired ticket data is stored in the ID tag 32. The ticket data in the ID tag 32 is read with a reader writer on using the ticket data, that is, entrance to a site 38 for example.

FIG. 14 illustrates this ticketing (booking) system including the electronic device comprising a portable telephone circuit 31a and an antenna 31b. The portable telephone 31 as the electronic device includes a memory 31c for storing program data, the CPU 2 for controlling the portable telephone 31 in accordance with the program data, an ID tag 32 having the communication circuit 11 for communicating with the CPU 2 and the non-volatile memory 10a for storing data from the CPU 2, the portable telephone circuit 31a for receiving ticket data with a predetermined format through a network 34, and the antenna 31b.

The portable telephone 31 can communicate with the (telephone) network 34 through the base station 33. Moreover, the portable telephone 31 can communicate with a ticket center 37 through gateway 35 and Internet 36.

The ticket center 37 sells tickets such as entrance tickets, gift coupons, passenger tickets, and notes used as money such as a prepaid card. A customer can buy a desired ticket by accessing the ticket center 37 and transmitting a predetermined data from a personal computer or a portable telephone 31. If the customer successfully buys the desired ticket, the portable telephone 31 receives the ticket data of the desired ticket with a predetermined format 31e for the ticket data.

The CPU 2 in the portable telephone 31 stores the ticket data in the ID tag 32.

Here, it is assumed that the ticket is for entrance of the site 38. The customer brings the portable telephone 31 to the site 38. The ticket examiner at the site 38 has a reader writer that can communicate with the ID tag 32. The site 38 has a terminal 39 that can be coupled to the ticket center 37 through the Internet 36 and receives the ticket data corresponding the ticket data stored in the ID tag 32 and forwards the thicket data to the reader writer 40. The reader writer reads the ticket data from ID tag 32 and judges whether the read ticket data satisfies the corresponding ticket data sent from the ticket center 37. If the read ticket data satisfies the corresponding ticket data sent from the ticket center 37, the reader writer 40 stores data indicative of used ticket in the ID tag 32. In the reading operation, the ticket data is directly read by the reader writer wirelessly and may be read the ticket data image displayed on the display 31d of the portable telephone 31 or the like.

FIG. 15 illustrates interaction among the portable telephone 31, the ticket center 37, and the site 38.

The user of the portable telephone 31 transmits an access request to the ticket center 37 in step A1, the ticket center 37 accepts the access request with a Web server (not shown) and transmits ticket reference data to the portable telephone 31 in step A2.

The user of the portable telephone 31 selects the desired ticket and offers to buy the thicket by transmitting application data in step A3 and conducts its payment process in step A4. In response to this, the ticket center 37 executes a predetermined thicket selling (booking) process in step A5. If the ticket selling condition is satisfied, the ticket center 37 transmits the ticket data to the potable telephone 31 in step A6 as ticket issuance operation.

When receiving the ticket data (payment data), the portable telephone 31 records the ticket data in the ID tag 32 therein in step A7. This operation completes the ticket acquiring operation. An external reader writer in site 38 can read the ticket data wirelessly though the portable telephone 31 is in a power off condition.

At the site 38, the user (customer) of the portable telephone 31 is required to show a ticket or the portable telephone 31 in step A8. The user of the portable telephone 31 shows the ticket examiner the portable telephone 31 as the ticket in this ticket system. The ticket examiner operates a reader writer to access the ID tag 32 in the portable telephone 31. Alternatively, the site 38 has a gate (not shown) with the reader writer 40. When the reader writer 40 permits entrance, the gate opens. In this operation, the reader writer transmits a request of transmission of the ticket data in step A8.

The portable telephone 31 receives the request, and then, reads and transmits the ticket data stored in the ID tag 32 through the antenna coil 7 in step A9.

The reader writer receives the ticket data and judges whether the ticket data satisfies the entrance permission condition. If the ticket data satisfies the entrance permission condition, the reader writer 40 transmits the entrance permission data and the used condition data of the ticket data to store it in the ID tag 32 and informs the ticket examiner of the permission of entrance or opens the gate in step A10.

The portable telephone 31 stores the received entrance permission data and used condition data in the ID tag 32 and finishes the process.

The site 38 can inquire the ticket data provided by the customer of the ticket center 37. Moreover, the site 38 may transmit the data regarding the thicket used thereat to the ticket center 37 to provide the used condition of this ticket.

If re-entrance is permitted at the site 38, the number of times of entrance may be recorded in the ID tag 32.

The recording operation of the used ticket for the ID tag 32 can be replaced with erasing the ticket data in the ID tag 32.

As mentioned above, the CPU 2 stores the ticket data in the ID tag 32 when the portable telephone circuit 31a receives the ticket data. When the wireless communication circuit (transmission and receiving circuit 9 and the antenna coil 9) in the ID tag 32 receives a predetermined reading request of the ticket data, the CPU 2 reads the ticket data, and transmits the read ticket data when the wireless communication circuit receives the predetermined reading request of the ticket data.

According to this embodiment, the user of the portable telephone 31 can use the ticket system without a paper ticket. Thus, the user of the portable telephone 31 with the ID tag 32 can get the ticket without going to any ticket agent and without receiving the paper ticket at any ticket agent through certification regarding the owner of the ticket.

Moreover, the ticket center 37 or the site 38 can omit process for issuing, delivering, withdrawing paper tickets and can obtain statistics data of sold or used tickets, so that the total efficiency in the system can be improved.

The ticket data in the ID tag 32 can be read and data can be stored in the ID tag 32 during a turn off condition of the portable telephone 31, so that the operation at the site 38 can be performed during power off or a fully discharged condition of the portable telephone 31.

[Seventh Embodiment]

FIGS. 16 to 24 illustrate the electronic device according to a seventh embodiment. The structure of the seventh embodiment is substantially the same as that of the first embodiment. The difference is in that the ID tag 5 in the electronic device is used in distribution of the electronic device. More specifically, the electronic device can execute a specific operation, if the electronic device is irregularly acquired and this is detected using the ID tag 5.

Figure 16:
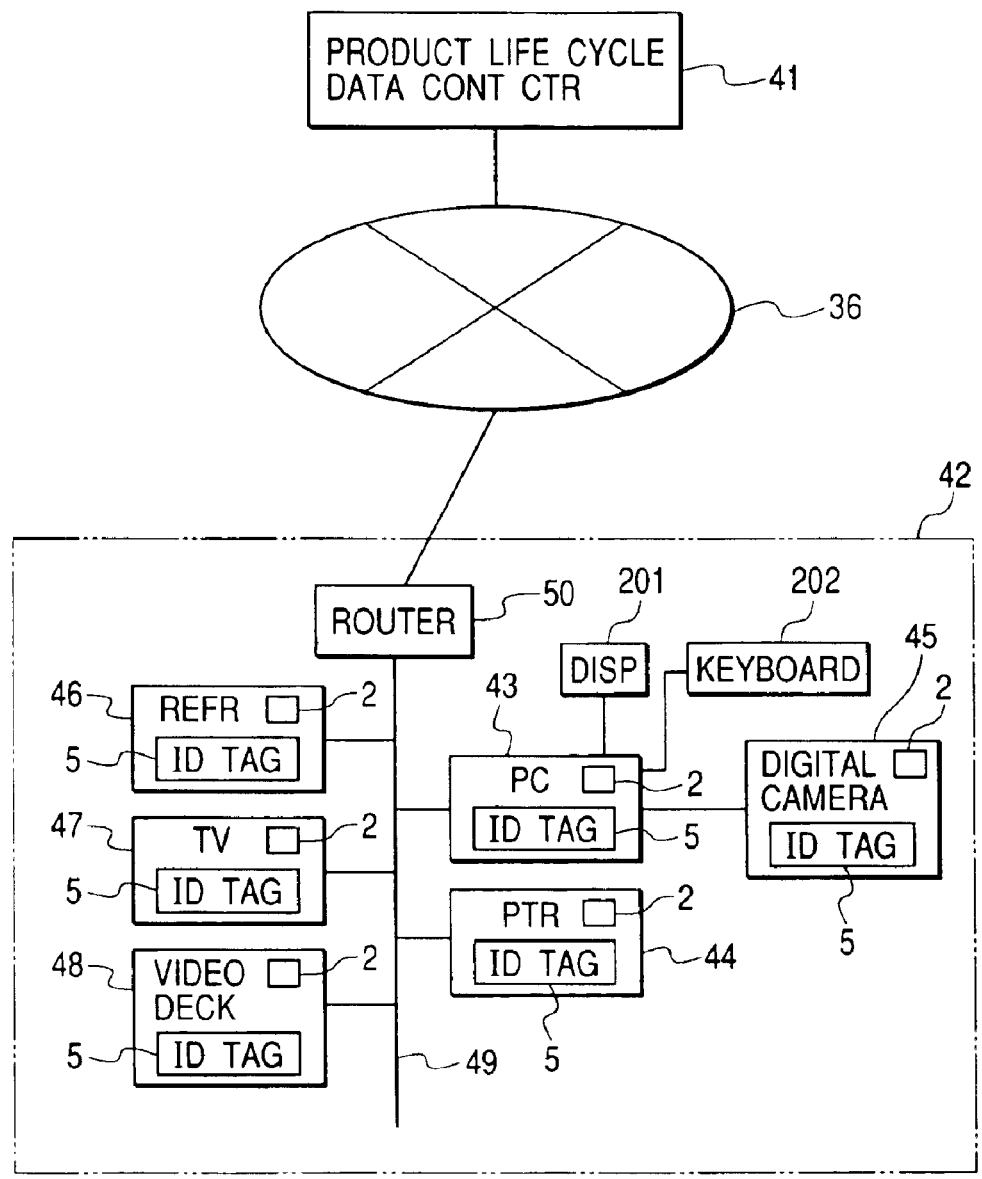
FIG. 16 is a block diagram of the system including electronic devices and a product lifecycle data control center according to a seventh embodiment.

FIG. 16 illustrates this system. In this system, a product lifecycle data control center 41 is provided to control products in lifecycle, that is, manufacturing, distribution, reusing or recycling and scrapping.

At home 42, which is a unit of control, variable electronic devices are connected through a LAN (local area network) 49 to a router 50 that can be coupled to the product lifecycle data control center 41 through the Internet 36.

Each of the electronic devices 43 to 48 has the ID tag 5. The ID tag 5 stores data usable for controlling data regarding the lifecycle of the electronic device at a data region. FIG. 17 shows the data including data used in respective stages, from manufacturing to recycling with a predetermined format. If all data cannot be recorded in the ID tag 5, non-recorded data can be read from the database in the product lifecycle data control center 41.

The data region is sectioned into five regions, that is, a maker region 171, an artery (upstream) physical distribution region 172, a market region 173, a vine (downstream) physical distribution 174, and a recycle region 175. Each data region can store a fixed type of data and a variable type of data. The maker region 171 records inherent data of the products at manufacturing as the fixed type data. As variable data, the payment for electronic device area 181 records data indicating that the cost of the product (electronic device) has not been received (unpaid). The payment for software area 182 records data indicating that the cost for functions of the installed software has not been received (unpaid).

The artery physical distribution region 172 stores names of deliverer (transporter) and shop. The market region 173 stores the name of the user, the name of a replaced part as condition data.

The vine physical distribution region 174 stores data indicating that the cost for recycling has been received (paid) or the name of a recycling company. The recycle region 175 stores data for reusing such as data of valuable parts or the number of times of reusing, data for recycle such as data of plastic material model number, and data for material such as data of environmental loading substance.

In this embodiment, illegal acquirement is judged using the data indicting that the cost of the product has been received or the data indicating that the cost of the software has been received.

Refrigerator

At first, a refrigerator will be described as the electronic device according this embodiment. FIG. 18 illustrates a protection process for illegal acquirement of the product. In this system, sellers are required to record the data indicating that the cost of the product has been received (paid) in the ID tag 5 when the product is sold at the shop with a reader writer. That is, this data is recorded at the payment for electronic device region 182 at the maker region.

Thus, if this data is not recorded at the payment for electronic device region 182, it is presumed that the cost for the refrigerator was not paid or received.

Here, if all shops have the reader writers, the initial data at the areas 181 and 182 at a manufacture are "unpaid". However, if only a portion of shops have the reader writers, the initial data at the manufacture are "paid", and changed to "unpaid" at shops when the refrigerators 46 were received from the manufacture to prevent erroneously recorded data.

When this refrigerator 46 is turn on, the CPU 2 executes operation as shown in FIG. 18. On power on, the CPU 2 reads the data in the ID tag 5 in step S11. In the following step S12, the CPU 2 judges whether the data indicates that the cost of the refrigerator 46 has been received (paid). If the data indicates that the cost of the refrigerator 46 has been received, the CPU 2 executes the normal control operation in step S13. If the data does not indicate that the cost of the refrigerator 46 has been received (unpaid), the CPU 2 turns off the refrigerator 46 in step S14.

Thus, according to this embodiment, though the product is illegally acquired, the use of the product is substantially prevented. This operation is also applicable to general home use electric devices such as the television set 47 or the video deck 48.

Personal Computer

Figure 19:
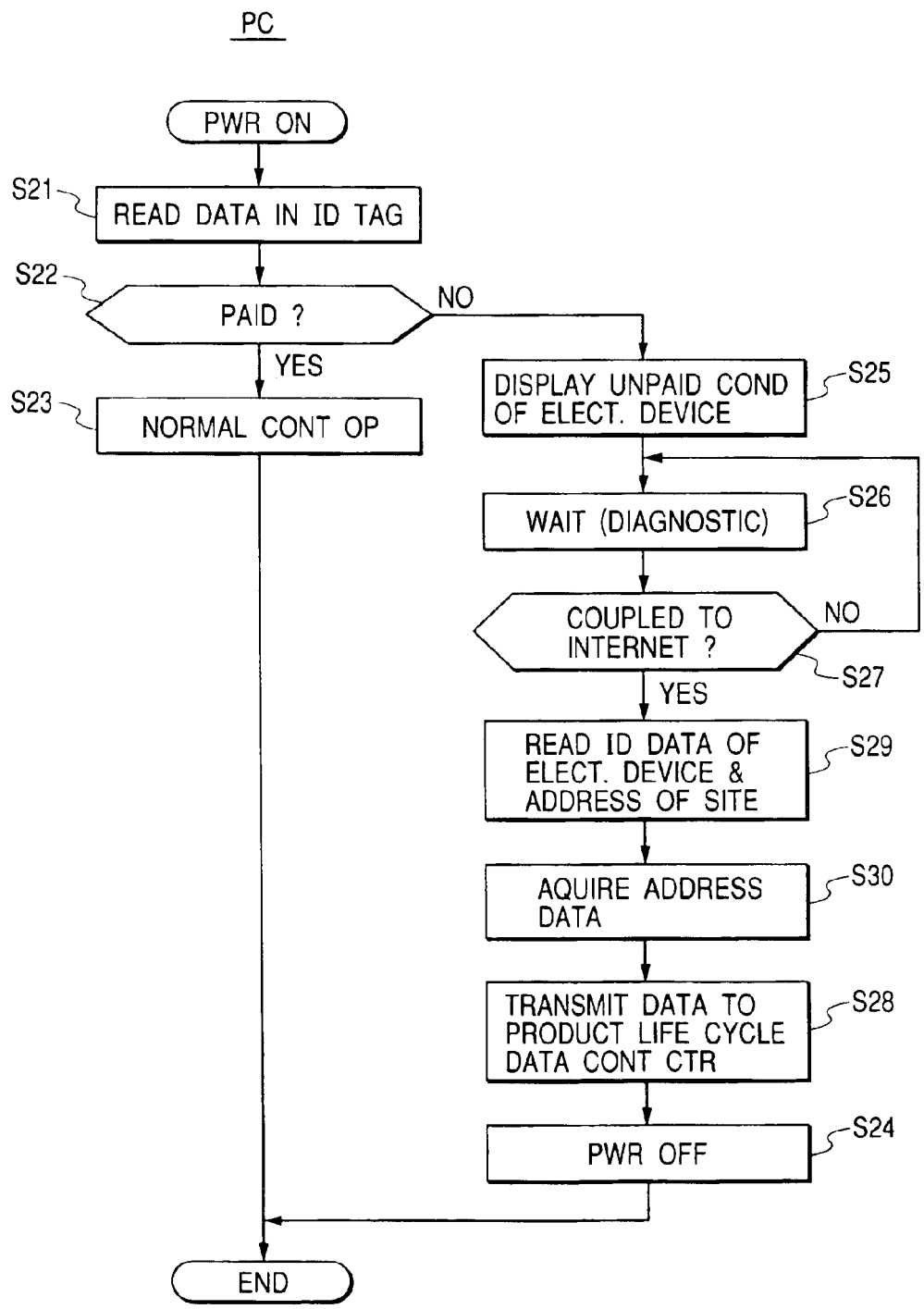

FIG. 19 illustrates a protection process for illegal acquirement of the personal computer 43. In this system, sellers are also required to record the data indicating that the cost of the product has been received in the ID tag 5 with a reader writer when the personal computer 43 is sold at the shop. That is, this data is recorded at the payment for electronic device area 181 at the maker region 171.

When this personal computer 43 is turn on, the CPU 2 executes operation as shown in FIG. 19. On power on, the CPU 2 reads the data in the ID tag 5 in step S21. In the following step S22, the CPU 2 judges whether there is the data indicates that the cost of the personal computer 43 has been received (paid). If there is the data indicates that the cost of the personal computer 43 has been received, the CPU 2 executes the normal control operation in step S23. If there is no data indicating that the cost of the personal computer 43 has been received, the CPU 2 displays that the cost of the personal computer 43 has not been paid on the display 201 in step S25. In step S26, the CPU 2 waits for a predetermined interval to execute a diagnostic operation. Next, the CPU 2 checks whether the personal computer 43 has been coupled to Internet 36 in step S27. If the personal computer 43 has not been coupled to Internet 36, processing returns to step S26. If the personal computer 43 has been coupled to Internet 38, processing proceed to step S29 where the CPU 2 reads the serial number (identification number) of the personal computer 43 at the serial number area 180 at the maker region 171 in FIG. 17. In the following step S30, the CPU 2 acquires address data of the personal computer 43 in the hard disk of the personal computer 43 as conditional data of the personal computer 43. Next, in step S28, the CPU 2 accesses the product lifecycle data control center 41 and transmits the data of identification number and as well as address data of the personal computer 43 to the product lifecycle data control center 41. Thus, the product lifecycle data control center 41 can obtain the data useful for identifying the person who illegally acquired the personal computer 43. Next, the CPU 2 turns off the personal computer 43 in step S24.

Thus, according to this embodiment, though the personal computer 43 is illegally acquired, the data of the personal computer 43 is transmitted to a predetermined site (product lifecycle data control center 41).

Software Installed in Personal Computer

In the personal computer 43, software is previously installed. When the user uses the personal computer 43, the user should pay the cost for the software in use.

Thus, the user should obtain the permission for using the desired software by paying the cost at the shop or after buying the personal computer 43. This data is stored in the ID tag 5 to allow the software to operate or not operate. In this system, sellers are required to record the data indicating that the cost of the product has been received in the ID tag 5 when the product is sold at the shop with a reader writer. That is, this data is recorded at the payment for software region 182 at the maker region 171.

Thus, if this data is not recorded at the payment for software region 182, it is presumed that the cost for the software was not paid or received.

Here, if all shops have the reader writer, the initial data at the areas 181 and 182 at a manufacture are "unpaid". However, if only a portion of shops have the reader writers, the initial data at the manufacture are "paid", and changed to "unpaid" at shops when the personal commuters 43 were received from the manufacture.

Figure 20A:
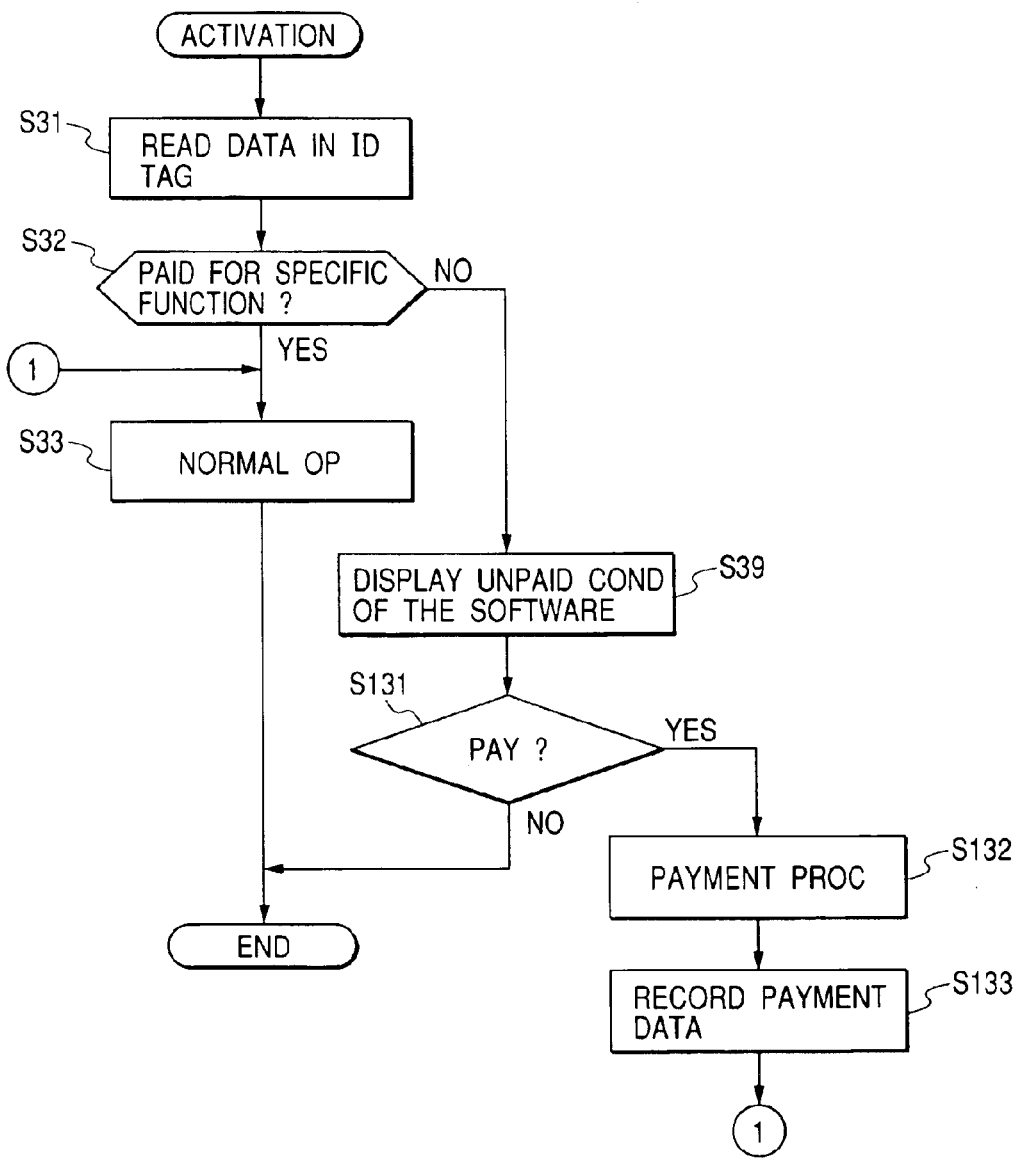

FIG. 20A illustrates the operation of the personal computer 43 regarding software.

When the personal computer 43 receives an execution (activation) command of specific software, the CPU 2 in the personal computer 43 reads the data in the ID tag 5 in step S31. In the following step S32, the CPU 2 judges whether there is the data indicating that the cost of the software or a specific function of the software has been received. If there is the data indicating that the cost of the software or a specific function has been received, the CPU 2 normally executes the software or the specific function of the software in step S33. If there is no data indicating that the cost has been received, the CPU 2 displays that the cost of the software or the specific function of the software has not been received on the display 201 of the personal computer 43 in step S39 and does not executes the software or does not enable to use the specific function of the software.

Thus, according to this embodiment, the user is prompted to pay the cost of the software automatically in addition to protection against illegal use of the software or a specific function of the software.

Moreover, the user can execute the payment process of the software through the Internet 36 if the user responds to the request for paying the cost in step S131. The user executes payment process in step S132, and the CPU 2 receives the payment data from the maker or a shop and stores the payment data in the ID tag 5 in step S133. This permits the execution of the software or the specific function of the software in step S23.

FIG. 20B illustrates another operation of the personal computer 43. In response to the detected power-on from the power on detection circuit 4a, the CPU 2 reads the data in the ID tag 5 and checks whether there is a predetermined data indicating registered operator at the registered ID data area 63 in the ID tag 5. If there is no registered operator's data in the ID tag 5 processing ends. If there is registered operator's data in the ID tag 5, the CPU 2 requests for inputting identification data of an operator with the display 201 in step 142. When identification data is not inputted with the keyboard 202 in response to the request or when the inputted data does not correspond the registered data, the CPU 2 executes a specific operation in step S145. If the identification data inputted with the keyboard 202 agrees with the registered data, the CPU 2 executes a normal operation in step S144.

Digital Camera

Figure 21:
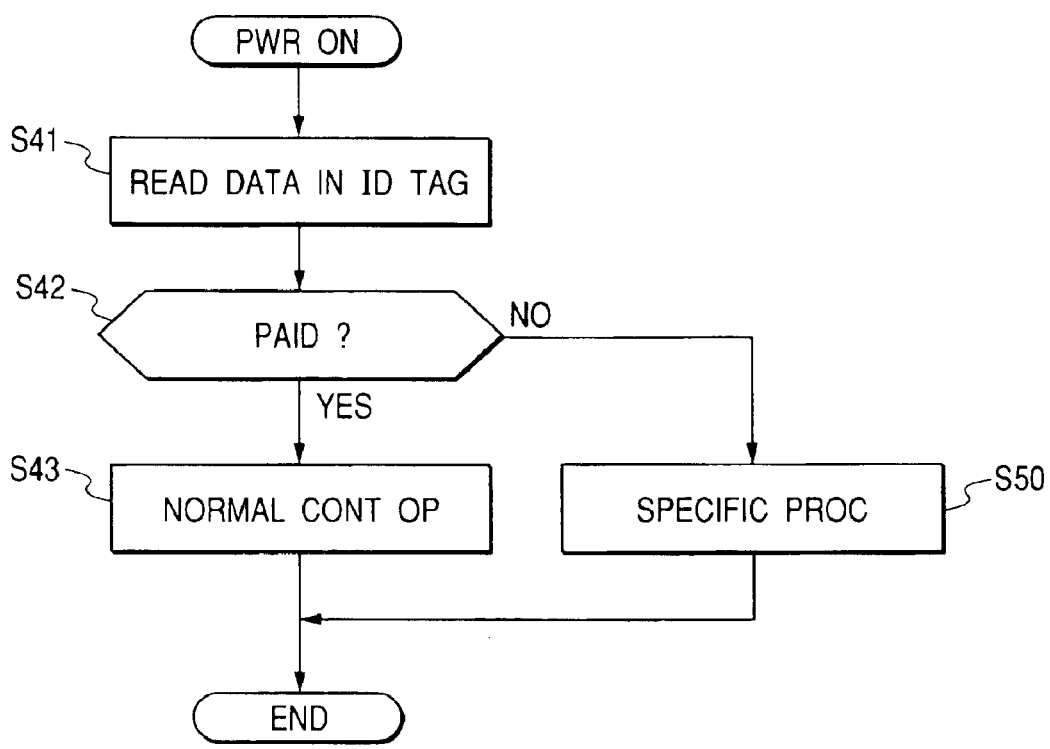

Next, the operation of the digital camera 45 will be described. In the digital camera 45, if the cost of the digital camera 45 has not been paid, it is possible to disable to operate the digital camera 45. However, this example informs a predetermined site of the data of the user who acquired the digital camera 45 illegally. FIG. 21 shows the power on operation of the digital camera 45.

When this digital camera 45 is turn on, the CPU 2 of the digital camera 45 executes operation as shown in FIG. 21. On power on, the CPU 2 reads the data in the ID tag 5 in step S41. In the following step S42, the CPU 2 judges whether there is the data at the area 181 indicating that the cost of the digital camera 45 has been received. If there is the data indicating that the cost has been received, the CPU 2 executes the normal control operation in step S43. If there is no data indicating that the cost has been received, the CPU 2 sets a specific process into an enable condition in step S50, wherein the shooting operation of the digital camera 45 is not protected now.

Figure 22:
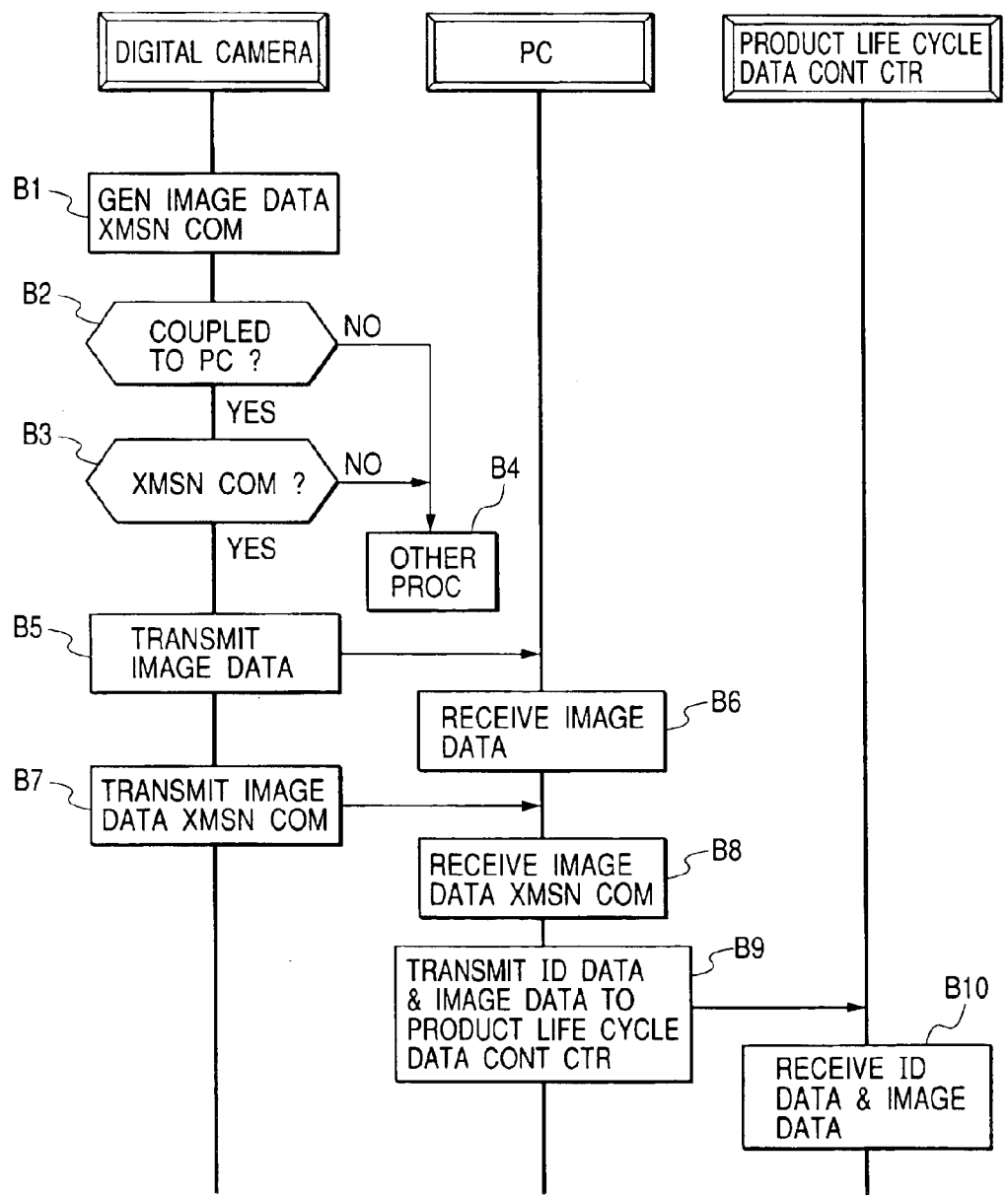

The specific process is executed during transmitting image data to the personal computer 43 or the like. FIG. 22 illustrates this specific process. In this operation, data transmission is executed between the digital camera 45 and the personal computer 43 and between the personal computer 43 and the product lifecycle data control center 41.

The CPU 2 in the digital camera 45 generates a transmission command to make the personal computer 43 transmit the image data to the product lifecycle data control center 41 during the process of the image data transmission to the personal computer 43 in step B1, wherein the CPU 2 reads identification data of the digital camera 45 and the address of the product lifecycle data control center 41 from the ID tag 5 to transmit the read identification data with the address.

In step B2, the CPU 2 judges whether the digital camera 45 is coupled to the personal computer 43. If the digital camera 45 is coupled to the personal computer 43, processing proceeds to step B3 where the CPU 2 judges whether the image data transmission command is inputted. If the image data transmission command is inputted, the CPU 2 transmits the image data stored in the memory in the digital camera 45 in step B5. In steps B2, B3, if the answer is "NO", other processes are executed in step B4.

The personal computer 43 receives the image data transmitted from the digital camera 45 and stores the image data in a predetermined storing region in step B6. During this, the digital camera 45 transmits the image data transmission command generated in step B1 to the personal computer 43 in step B7.

When the personal computer 43 receives this image data transmission command in step B8, the personal computer 43 transmits the received image data and the ID data of the digital camera 45 to the product lifecycle data control center 41 in step B9.

This process intends to automatically transmit the data regarding the digital camera 4f and the user to the product lifecycle data control center 41 when the personal computer 43 is connected to Internet 36.

The product lifecycle data control center 41 receives the image data and the ID data of the digital camera 45 transmitted via the personal computer 43 to collect data regarding the illegally acquired digital camera 45 which is analyzed to identify the user.

For example, the image data shot by the digital camera 45 may frequently include the person other than the user but it includes a hint about the address of the user and further it may include the image of the user itself. Thus, the received image data can be used to identify the user.

Moreover, after the image data transmission process, it is possible to inhibit the use of the digital camera 45. This process inhibits the use of the digital camera 45 on the next power on or at once to prevent the illegal use of the digital camera 45.

Printer

Figure 23:
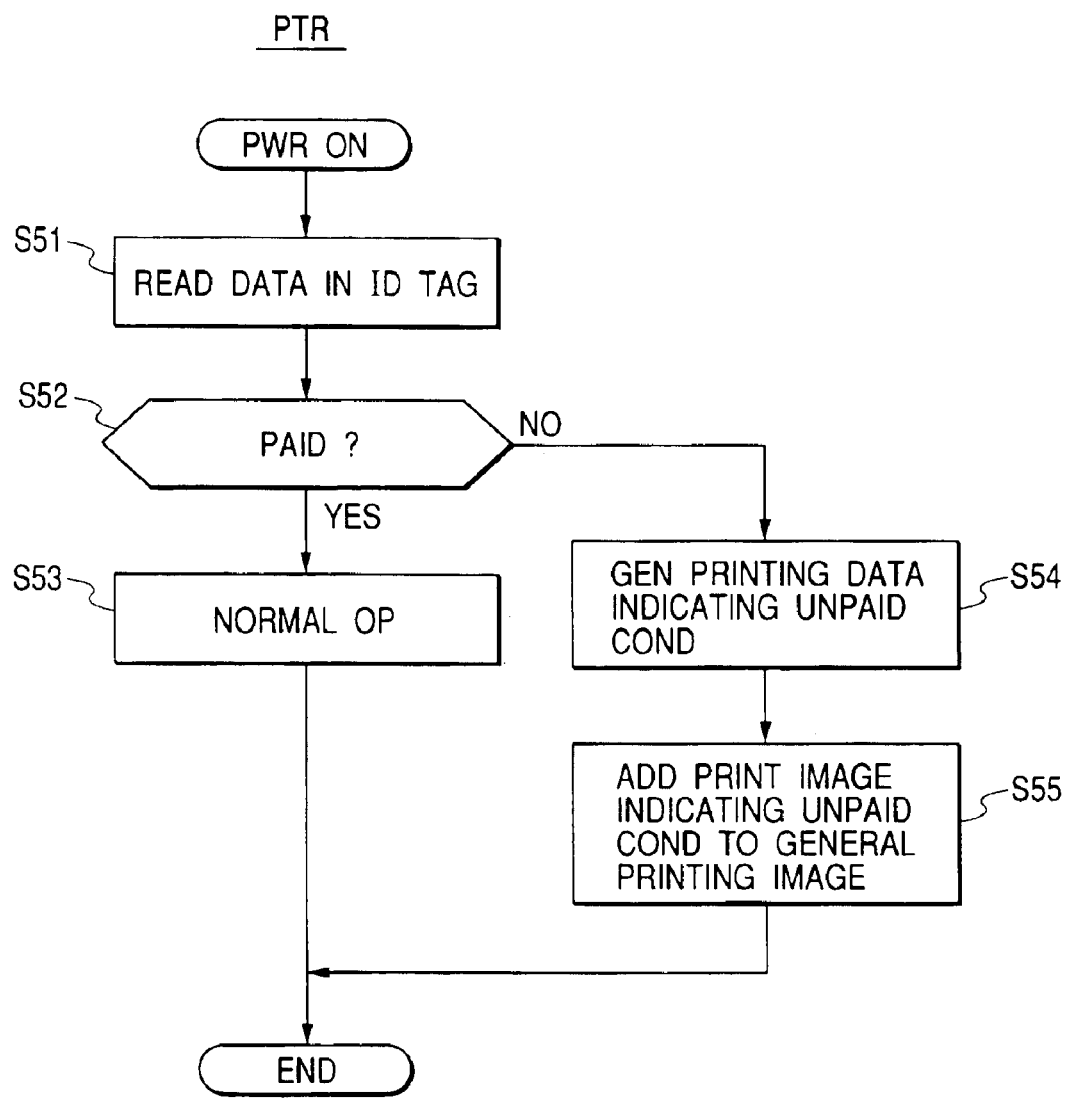

FIG. 23 illustrates the operation of a printer 44.

When the printer 44 is turned on, the CPU 2 of the printer 44 reads the data in the ID tag 5 in step S51. In the following step S52, the CPU judges whether there is the data indicating that the cost of the printer 44 has been received (paid). If there is the data indicating that the cost of the printer 44 has been received, the CPU 2 executes the normal operation of the printer 44 in step S53. If there is no data indicating that the cost has been received, the CPU 2 generates print message data indicating that the cost of the printer 44 has not been received in step S54. In the following step S55, the CPU 2 of the printer 44 adds a printed message data to the received every page of the print data to indicate that the cost had not received.

According to this embodiment, the printed message indicates that the user illegally acquired the printer 44 and cannot do the normal printing operation, so that this prevents illegally acquiring the printer 5. There are various methods of printing the message. For example, the warning message is printed everywhere at every page or the massage is printed as the background image.

Figure 24:
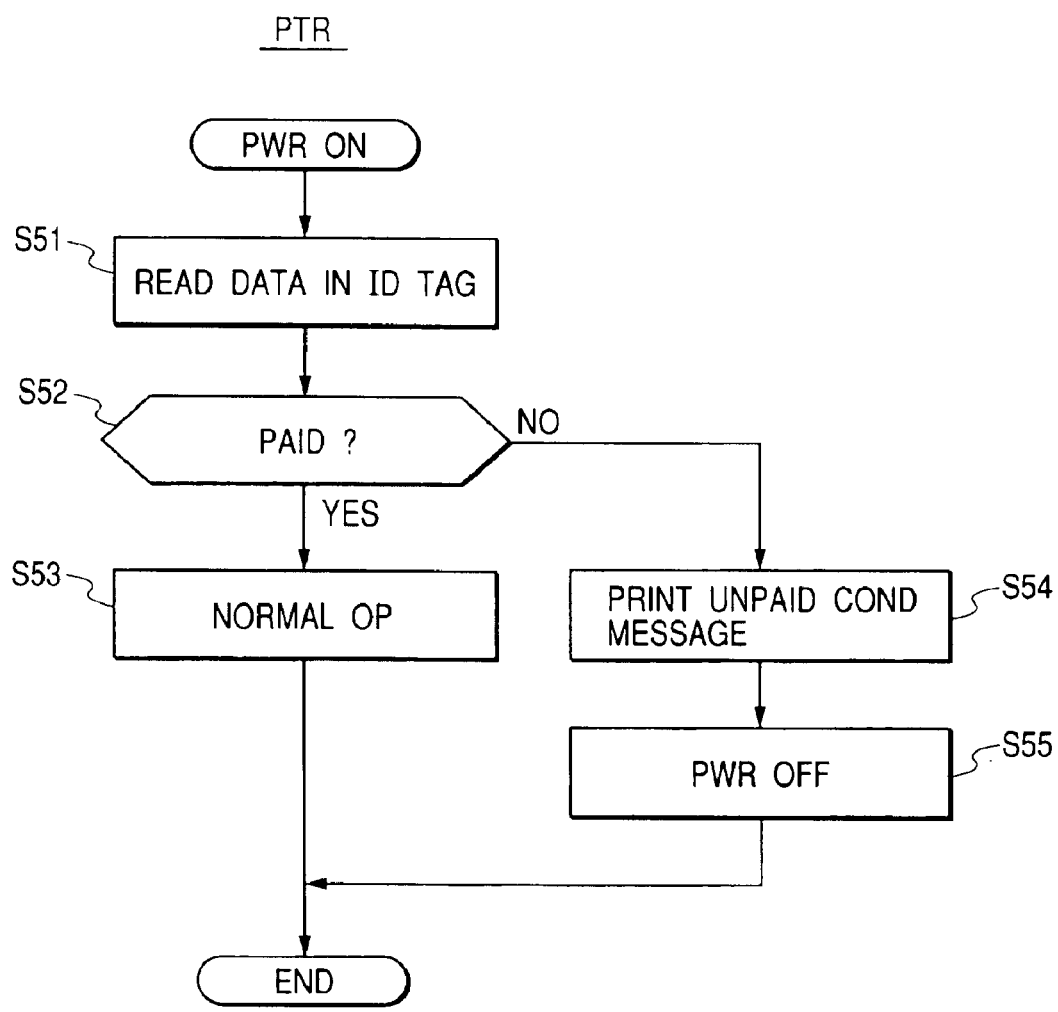

FIG. 24 illustrates a modification operation. "No" in S52, the CPU 2 of the printer 44 immediately outputs the warning message that the cost has not been received in step S54. In the following step S55, the CPU 2 turns off the power to inhibit the printing operation to prevent the illegal acquiring the printer 44.

According to this embodiment, the user of the printer 44 including the ID tag 5 prevents the illegal use of the printer 44.

[Eighth Embodiment]

Figure 25:
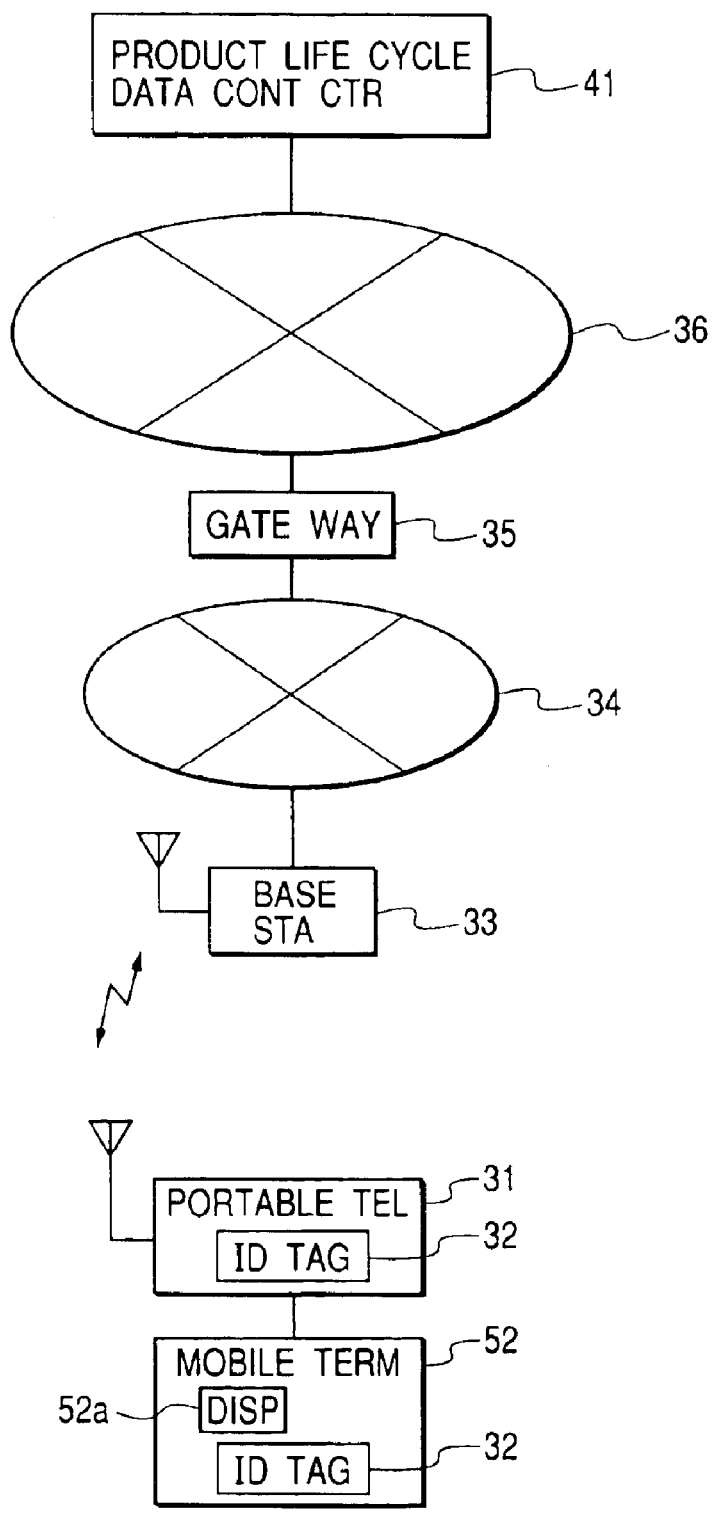
FIG. 25 illustrates the system according to an eighth embodiment.

FIGS. 25 to 27 illustrate the electronic device according to an eighth embodiment. The structure of the eighth embodiment is substantially the same as that of the seventh embodiment. The difference is in that the ID tag 5 is used for preventing illegal acquirement of a portable electronic device such as a portable telephone 31 or a mobile terminal 52.

FIG. 25 illustrates the system structure. The portable (cellular) telephone 31 can access the product lifecycle data control center 41 via the base station 33, the telephone network 34, the gateway 35, and Internet 36 as similarly as the sixth embodiment. The mobile terminal 52 can access Internet 36 through the portable telephone 31.

FIG. 26 illustrates the operation of the CPU 2 in the portable telephone 31. When the portable telephone 31 is turned on, the CPU 2 of the portable telephone 31 reads the data in the ID tag 5 in step S61. In the following step S62, the CPU 2 judges whether there is the data indicating that the cost of the portable telephone 31 has been received (paid). If there is the data indicating that the cost of the portable telephone 31 has been received, the CPU 2 executes the normal operation of the printer 44 in step S63. If there is no data indicating that the cost has been received, the CPU 2 acquires and transmits the telephone number of the portable telephone 31 to the product lifecycle data control center 41 via Internet 36 in step S64. In the following step S65, the CPU 2 of the portable telephone 31 transmits the position data of the portable telephone 31 to the product lifecycle data control center 41 if the portable telephone includes a GPS function.

This provides quick identification of user who illegally acquired the portable telephone 31 from the telephone number and the position data. This operation is applicable to the mobile terminal 52 when the mobile terminal 52 is coupled to Internet 36 via the portable telephone 31.

FIG. 27 illustrates the operation of the mobile terminal 52 for preventing illegal use of the software installed in the mobile terminal 52.

When the mobile terminal 52 receives an execution command of specific software, the CPU 2 of the mobile terminal 52 reads the data in the ID tag 5 in step S71. In the following step S72, the CPU 2 judges whether there is the data indicating that the cost of the software or a specific function of the software has been received. If there is the data indicating that the cost of the software or a specific function has been received, the CPU 2 executes the software or the specific function of the software normally in step S73. If there is no data indicating that the cost has been received, the CPU 2 displays that the cost of the software or the specific function of the software has not been received on the display 52a of the mobile terminal 52 in step S79 and does not execute the software or does not enable to use the specific function of the software.

Thus, according to this embodiment, the user is prompted to pay the cost of the software automatically in addition to protection against illegal use of the software or a specific function of the software.

Moreover, the user can execute the payment process of the software through the Internet 36 in the same way as shown in FIG. 20A. The CPU 2 receives the payment data from the maker or a shop and stores the payment data in the ID tag 5. This permits the execution of the software or the special function of the software.

[Ninth Embodiment]

Figure 28A:
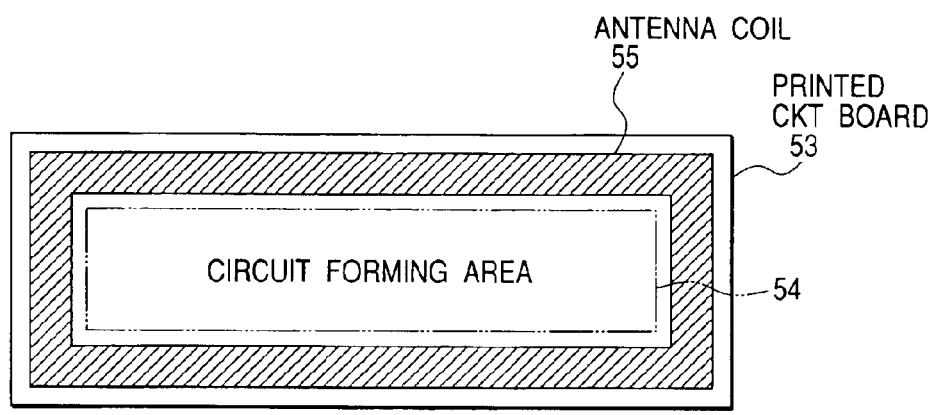
FIG. 28A illustrates a plan view of a printed circuit board of the electronic device according to a ninth embodiment.
Figure 28B:
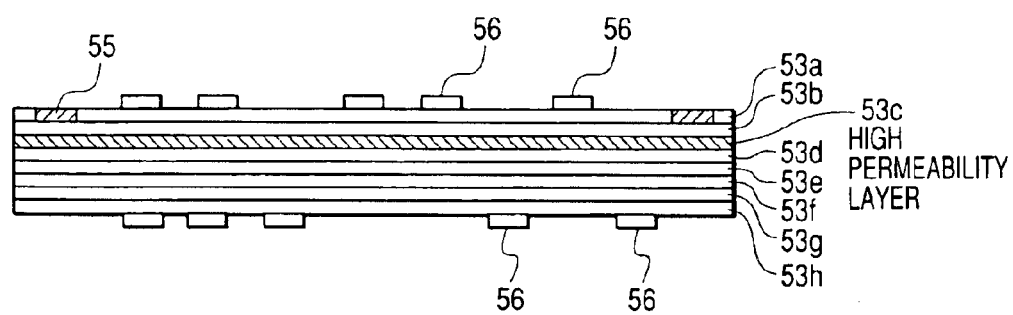
FIG. 28B is a sectional view of the printed circuit board according to the ninth embodiment.

FIG. 28A illustrates a plan view of a printed circuit board 53 of the electronic device mounting the CPU 2 and the ID tag 5. FIG. 28B is a partial sectional view of the printed circuit board 53. The structure of the ninth embodiment is substantially the same as that of the first embodiment. The difference is in that the printed circuit board 53 comprises a multi-layer printed circuit board and one layer comprises a high magnetic permeability material.

On the top surface of the printed circuit board 53, a circuit forming area 54 is arranged at the center of the top surface and the antenna coil 55 of the ID tag is arranged around the circuit forming area 54.

The printed circuit board 53 includes a ground pattern layer 53d and a power supply pattern layer 53f to operate circuits elements 56, wherein patterns of both layers 53d and 53f have all-over patterns (except through holes, via holes) or relative wide patterns to provide a compact printed circuit board. However, the all-over patterns of the ground pattern layer 53d and the power supply pattern layer 53f make the operation of the antenna coil 55 unstable. That is, portions of the ground pattern layer 53d and the power supply pattern layer 53f under the antenna coil 55 affect the operation of the antenna coil 55. To prevent this affection, the high magnetic permeability material is used as the layer 53c.

The multi-layer printed circuit board 53 includes, in sequence, a copper foil pattern layer 53a for the antenna coil 53a or the like, an epoxy layer 53b, the high permeability layer 53c, the ground pattern layer 53d, an epoxy layer 53e, the power supply pattern layer 53f, an epoxy layer 53g, and a copper foil layer 53h.

The high permeability layer 53c is sandwiched between the epoxy layer 53b and the ground pattern layer 53d and fixed with adhesive. The presence of the high permeability layer 53c makes the operation of the antenna coil pattern 55 stable.

[Modifications]

This invention can be modified.

Figure 29:
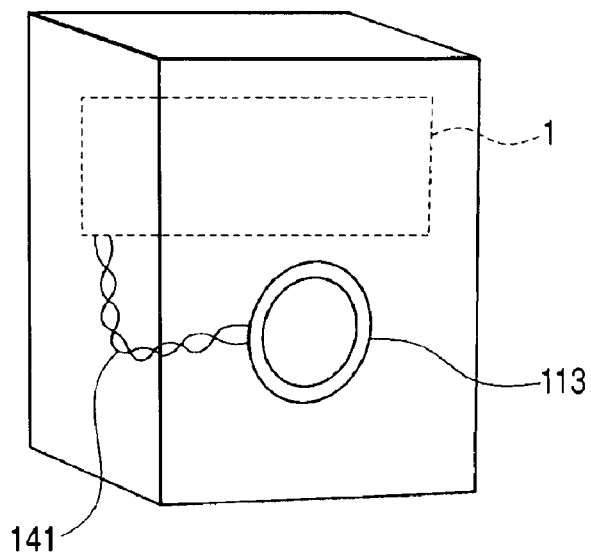
FIG. 29 is an example of modification according to the invention.

FIG. 29 shows an example of modification. In FIG. 29, the antenna coil 113 can be located at a remote place from the ID tag chip on the printed circuit board 1, where the reader writer can communicate with the ID tag 5. This improves the ID tag operation communication operation because of a shorter distance communication than that by the antenna coil pattern 7 on the printed circuit board 1.

In this case, the ID tag chip is connected to the antenna coil 113 with a twist-pair cable 141 to suppress noise level.

The ID tag 5 and the CPU 22 can be used for aims other than recycling and reusing. For example, the ID tag 5 and the CPU 22 can record registration data or various historic data of the user or various data can be record in,the ID tag 5 and the CPU 22 wirelessly.

Figure 30:
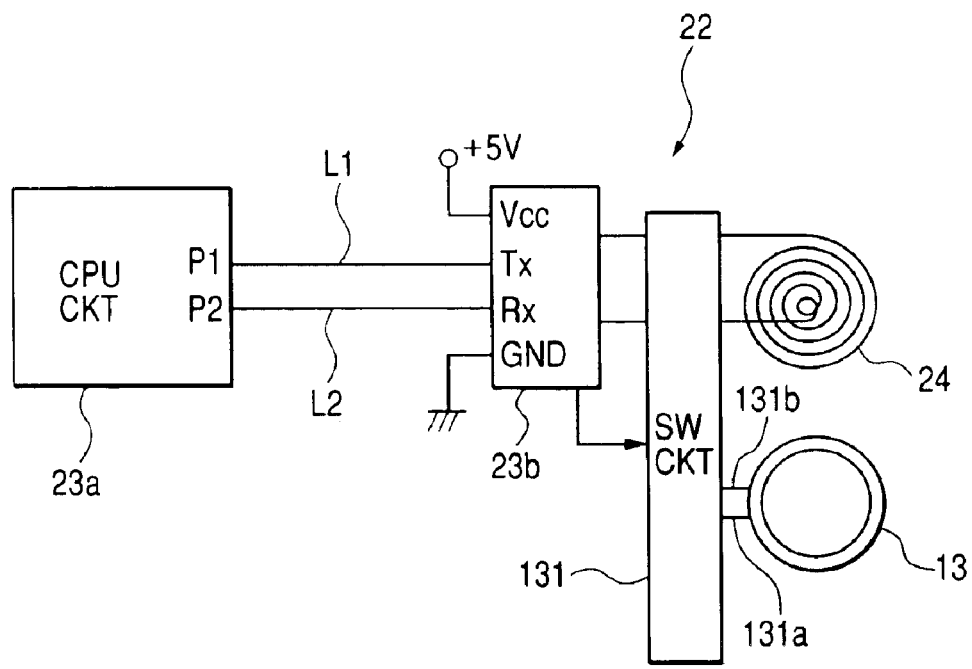
FIG. 30 is another example of modification according to the invention.

FIG. 30 shows another modification wherein the antenna coil 24 and the discrete antenna coil 13 are selectively used. That is, if the external antenna coil 13 is provided in addition to the antenna coil 24 integrated in the ID tag, either of antenna coil 24 or 13 is electrically connected to the ID tag chip 23b through a switch 131 under control by the ID tag chip 23b. Moreover, if both antenna coils are connected to the ID tag chip 23b, only the data from either of antenna coil 24 or 13 is used. The CPU circuit 23a is coupled to the ID tag chip 23b through lines L1 and L2.

Figure 31:
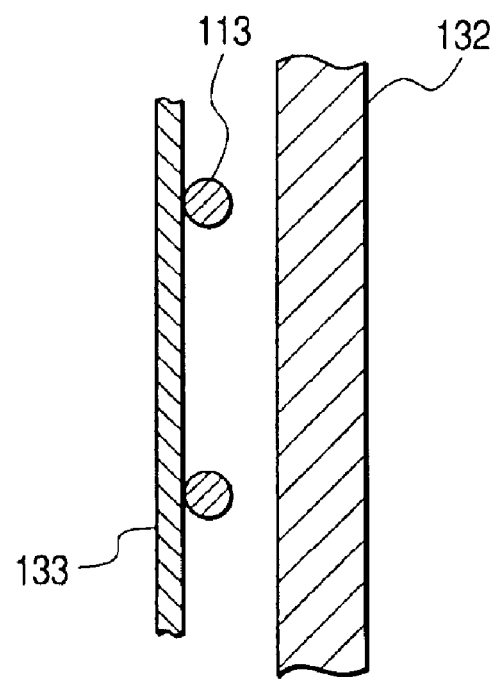
FIG. 31 is still another example of modification according to the invention.

FIG. 31 shows a partial sectional view of a refrigerator operation panel as still another example of modification. The external antenna coil 113 on a printed circuit board 133 is covered with a radio wave transparent member 132 such as a dielectric substance or a plastic panel as a portion of the case of the refrigerator. According to this structure, the reader writer is easily accessible to the external antenna coil 113.

The sixth embodiment was described with the portable telephone as an example. However, this embodiment is applicable to combination of a mobile terminal and the portable telephone. Moreover, the ticket data may be displayed with data medium such as bar codes or a QR code that can be displayed on a general display such as an LCD (liquid crystal display). Further, this embodiment is applicable to tickets such as entrance tickets, gift coupons, passenger tickets, notes used as money such as a prepaid card, and book gift coupons.

In the seventh and eight embodiments, the electronic devices 31, 43 to 48, and 52 executes different countermeasure operation against illegal use. However, they can commonly execute the power-off operation when illegal use is detected. Moreover, they can commonly execute transmission operation for transmitting the data for identifying the user through Internet 36.

What is claimed is:

1. An electronic device comprising:
    a central processing unit for controlling said electronic device;
    a signal line; and
    an ID tag having a communication circuit for communicating with said central processing unit through said signal line and a non-volatile memory for storing data from said central processing unit, said central processing unit obtaining operation record data of said electronic device and storing said operation record in said non-volatile memory as said data, wherein
    said non-volatile memory has a manufacturing data area and an operating time data area, and manufacturing data regarding said electronic device has been stored at said manufacturing data area of said non-volatile memory in a manufacturing process of said electronic device.

2. The electronic device as claimed in claim 1, further comprising a plurality of units, wherein said manufacturing data includes data of a body of said electronic device and said units regarding structure, materials, and scraping processes.

3. An electronic device comprising:
    a central processing unit for controlling said electronic device;
    a signal line;
    an ID tag having a communication circuit for communicating with said central processing unit through said signal line and a non-volatile memory for storing data from said central processing unit, said central processing unit obtaining operation record data of said electronic device and storing said operation record in said non-volatile memory as said data; and
    a plurality of units, wherein said central processing unit obtains operating time data of said electronic device and operating time data of said units, and wherein said central processing unit stores a predetermined part of said operating time data of said electronic device and said units in said non-volatile memory.

4. A central processing unit for an electronic device comprising:
    a substrate;
    a central processing unit portion in a form of a semiconductor chip on said substrate for controlling said electronic device, said central processing unit portion having a memory storing an operation record data obtaining program for obtaining operation record data of said electronic device;
    a signal line;
    an ID tag semiconductor circuit coupled to said central processing unit portion with a non-volatile memory for communicating with said central processing unit portion through said signal line to store said operation record data from said central processing unit portion in said non-volatile memory;
    an antenna coil on said substrate arranged around said central processing unit portion, a wireless communication circuit for wirelessly transmitting said data from said non-volatile memory through said antenna coil, and sealing plastic for sealing said antenna coil and semiconductor chip; and
    terminals connectable to an external antenna coil and a switch connectable to said wireless communication circuit for using either of said antenna coil or said external antenna coil.

5. An electronic device comprising:
    a central processing unit for controlling said electronic device;
    a signal line;
    an ID tag having a communication circuit for communicating with said central processing unit through said signal line and a non-volatile memory for storing data from said central processing unit, said ID tag including an antenna coil and a semiconductor circuit including said non-volatile memory, a read-write circuit for said non-volatile memory, a wireless communication circuit for wirelessly transmitting said data from said non-volatile memory through said antenna coil, and a power supply circuit for wirelessly receiving a supply power through said antenna coil to supply a power to said non-volatile memory, said read-write circuit, and said wireless communication circuit; and
    a portable telephone circuit for receiving ticket data, wherein said central processing unit stores said ticket data in said ID tag when said portable telephone circuit receives said ticket data, and said central processing unit reads said ticket data from said ID tag and transmits said ticket data from said ID tag when said wireless communication circuit receives a predetermined reading request of said ticket data.

6. An electronic device comprising:
    a central processing unit for controlling said electronic device;
    a signal line;
    an ID tag having a communication circuit for communicating with said central processing unit through said signal line and a non-volatile memory for storing data from said central processing unit, wherein
    said electronic device has a plurality of functions executed by said central processing unit, and said central processing unit reads said data from said ID tag and executes only a portion of said functions indicated by said data,
    said central processing unit judges whether, in said data, there is a predetermined data indicating that the cost of said electronic device has been paid, and said central processing unit executes a specific one of said predetermined functions in the absence of said predetermined data; and
    a power-on detection circuit and informing means, in response to said detected power-on, said central processing unit judges whether, in said data, there is a predetermined data indicating registered operator in said ID tag and requests for inputting identification data of an operator with said informing means in the presence of said predetermined data, and said central processing unit executes a specific operation, when said identification data is not inputted in response to said request, and when the inputted data does not correspond said predetermined data.

7. An electronic device comprising:

a central processing unit for controlling said electronic device;

a signal line;

an ID tag having a communication circuit for communicating with said central processing unit through said signal line and a non-volatile memory for storing data from said central processing unit; and communication means communicable with a network, wherein said ID tag stores an identification number of said electronic device, and said central processing unit judges whether, in said data, there is a predetermined data indicating that the cost of this electronic device has been paid, and said central processing unit reads said identification data of said electronic device and an address of a predetermined site and transmits said identification number to a predetermined site with said read address through said communication means and said network in the absence of said predetermined data.

8. The electronic device as claimed in claim 7, further comprising conditional data acquiring means for acquiring conditional data of said electronic device and said central processing unit transmits said conditional data together with said identification data in the absence of said predetermined data.

9. An electronic device comprising:

a central processing unit for controlling said electronic device;

a signal line;

an ID tag having a communication circuit for communicating with said central processing unit through said signal line and a non-volatile memory for storing data from said central processing unit, wherein said electronic device has a plurality of functions executed by said central processing unit, and said central processing unit reads said data from said ID tag and executes only a portion of said functions indicated by said data, and said central processing unit judges whether, in said data, there is a predetermined data indicating that the cost of this electronic device has been paid, and said central processing unit executes a specific one of said predetermined functions in the absence of said predetermined data; and a digital camera unit generating image data and an interface circuit communicable with a personal computer, wherein said central processing unit transmits a forwarding request to said personal computer as said one of said predetermined functions when said image data is transmitted to said personal computer through said interface circuit in the absence of said predetermined data in said ID tag to operate said personal computer to transmit said image data to a predetermined site if said personal computer has communication means for communicating with a network and communication with said network is possible.

10. An electronic device comprising:

a central processing unit for controlling said electronic device;

a signal line;

an ID tag having a communication circuit for communicating with said central processing unit through said signal line and a non-volatile memory for storing data from said central processing unit, wherein said electronic device has a plurality of functions executed by said central processing unit, and said central processing unit reads said data from said ID tag and executes only a portion of said functions indicated by said data, and said central processing unit judges whether, in said data, there is a predetermined data indicating that the cost of this electronic device has been paid, and said central processing unit executes a specific one of said predetermined functions in the absence of said predetermined data; and a printer unit outputting a printed image on a sheet of paper, wherein said central processing unit outputs said printed image indicating that the cost of this electronic device has not been paid as said one of predetermined function in the absence of said predetermined data.

* * * * *